(12) United States Patent
Goto et al.

(10) Patent No.: US 8,334,621 B2
(45) Date of Patent: Dec. 18, 2012

(54) ELECTRONIC EQUIPMENT AND POWER SUPPLY STATE CONTROL METHOD FOR ELECTRONIC EQUIPMENT

(75) Inventors: Hirotaka Goto, Chiba (JP); Yuko Uchiumi, Kanagawa (JP)

(73) Assignee: Sony Corporation (JP)

( * ) Notice: Subject to any disclaimer, the term of this patent is extended or adjusted under 35 U.S.C. 154(b) by 645 days.

(21) Appl. No.: 12/462,666

(22) Filed: Aug. 6, 2009

(65) Prior Publication Data

US 2010/0033026 A1   Feb. 11, 2010

(30) Foreign Application Priority Data

Aug. 8, 2008   (JP) .................. P2008-206255

(51) Int. Cl.
*H01H 83/00* (2006.01)
*H02H 3/00* (2006.01)

(52) U.S. Cl. ........................................ 307/126

(58) Field of Classification Search .......... 307/126
See application file for complete search history.

(56) References Cited

U.S. PATENT DOCUMENTS

| | | | |
|---|---|---|---|
| 7,937,605 B2* | 5/2011 | Rea et al. | 713/503 |
| 2009/0041438 A1* | 2/2009 | Kuno | 386/126 |
| 2009/0046210 A1* | 2/2009 | Sakamoto et al. | 348/738 |
| 2009/0284665 A1* | 11/2009 | Mizoguchi et al. | 348/738 |
| 2010/0115318 A1* | 5/2010 | Suzuki et al. | 713/323 |

FOREIGN PATENT DOCUMENTS

| | | | |
|---|---|---|---|
| JP | 2004349790 A | * | 12/2004 |
| WO | 2008108070 A1 | | 9/2008 |

OTHER PUBLICATIONS

High-Definition Multimedia Interface Specification, Version 1.3a, Nov. 10, 2006, pp. ii-156 and Supplement 1 Consumer Electronics Control (CEC), pp. ii-97.
Office Action from Japanese Application No. 2008-206255, dated Jun. 1, 2010.

* cited by examiner

*Primary Examiner* — Hal Kaplan
(74) *Attorney, Agent, or Firm* — Lerner, David, Littenberg, Krumholz & Mentlik, LLP

(57) ABSTRACT

An electronic equipment includes:
a data transmission unit that transmits or receives content data to or from an external equipment;
a power supply turned-on information acquisition unit that acquires power supply turned-on information concerning the external equipment;
an information-on-manipulation acquisition unit that acquires information on a power supply turning-on manipulation; and
a power supply state control unit that controls a power supply state into any of an off state, a standby state, and an on state,
wherein when the power supply turned-on information concerning the external equipment with the power supply state set to the off state is acquired, the power supply state control unit changes the power supply state to the standby state; and
when the information on the power supply turning-on manipulation with the power supply state set to the standby state is acquired, the power supply state control unit changes the power supply state to the on state.

11 Claims, 19 Drawing Sheets

FIG.8
HDMI PIN CONFIGURATION (OF TYPE A)

| PIN | Signal Assignment |
|---|---|
| 1 | TMDS Data2+ |
| 3 | TMDS Data2- |
| 5 | TMDS Data1 Shield |
| 7 | TMDS Data0+ |
| 9 | TMDS Data0- |
| 11 | TMDS Clock Shield |
| 13 | CEC |
| 15 | SCL |
| 17 | DDC/CEC Ground |
| 19 | Hot Plug Detect |

| PIN | Signal Assignment |
|---|---|
| 2 | TMDS Data2 Shield |
| 4 | TMDS Data1+ |
| 6 | TMDS Data1- |
| 8 | TMDS Data0 Shield |
| 10 | TMDS Clock+ |
| 12 | TMDS Clock- |
| 14 | Reserved(N.C. on device) |
| 16 | SDA |
| 18 | +5V Power |

FIG. 11

EVENT LIST

| EVENT NAME | FROM | TO |
|---|---|---|
| HPD OFF EVENT | HPD DETECTING STATE MACHINE | POWER SUPPLY MANAGING STATE MACHINE |
| HDMI COUPLED EVENT | HPD DETECTING STATE MACHINE | POWER SUPPLY MANAGING STATE MACHINE |
| HDMI UNCOUPLED EVENT | HPD DETECTING STATE MACHINE | POWER SUPPLY MANAGING STATE MACHINE |
| SINK OFF EVENT | SINK POWER SUPPLY MONITORING STATE MACHINE | POWER SUPPLY MANAGING STATE MACHINE |
| SINK ON EVENT | SINK POWER SUPPLY MONITORING STATE MACHINE | POWER SUPPLY MANAGING STATE MACHINE |
| POWER SUPPLY TURNED ON EVENT | USER (OVER CEC LINE) | POWER SUPPLY MANAGING STATE MACHINE |
| POWER SUPPLY TURNED OFF EVENT | USER (OVER CEC LINE) | POWER SUPPLY MANAGING STATE MACHINE |

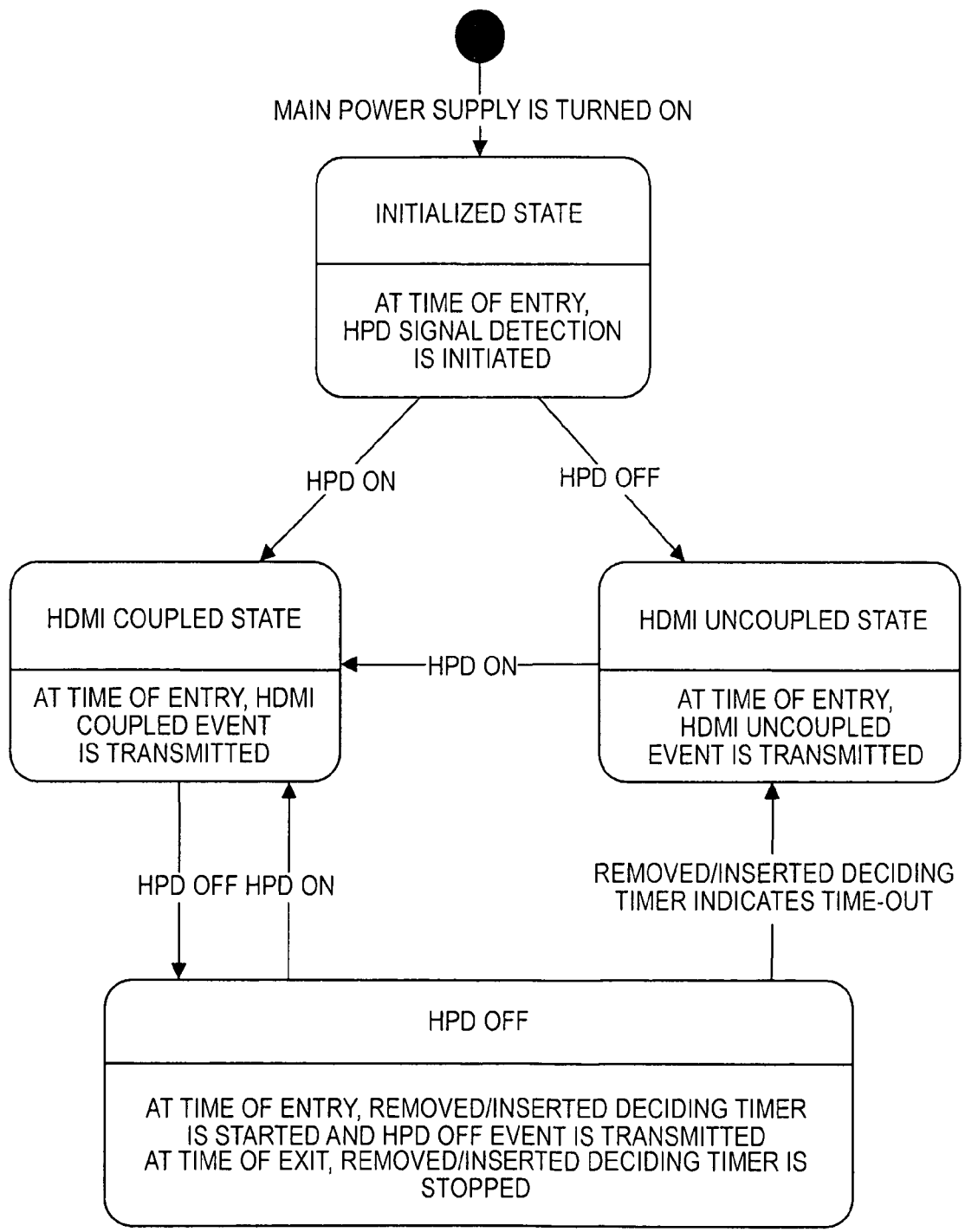

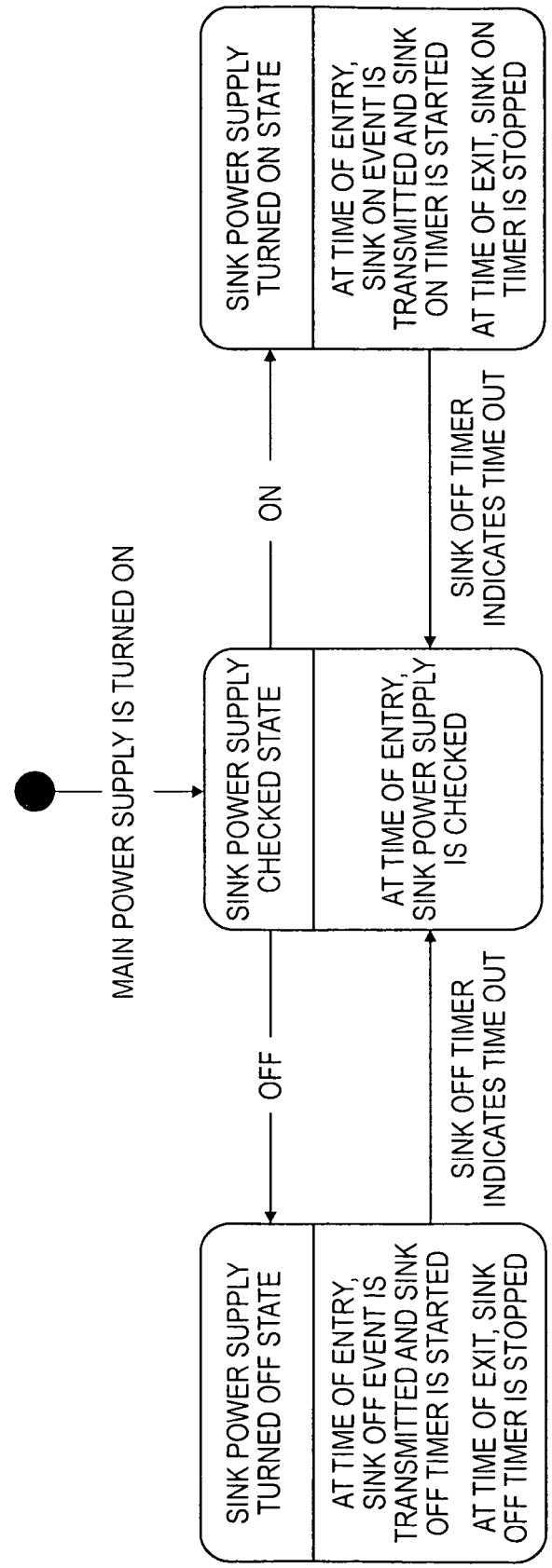

TIME T10 TAKEN TO OUTPUT IMAGE AND SOUNDS AFTER SINK INPUTS ARE SWITCHED AND SOURCE POWER SUPPLY IS TURNED ON

ELECTRONIC EQUIPMENT AND POWER SUPPLY STATE CONTROL METHOD FOR ELECTRONIC EQUIPMENT

CROSS-REFERENCE TO RELATED APPLICATION

The present application claims priority from Japanese Patent Application No. JP 2008-206255 filed in the Japanese Patent Office on Aug. 8, 2008, the entire content of which is incorporated herein by reference.

BACKGROUND OF THE INVENTION

1. Field of the Invention

The present invention relates to an electronic equipment and a power supply state control method for an electronic equipment. More particularly, the present invention is concerned with an electronic equipment and a power supply state control method for an electronic equipment that make it possible to shorten the time, which elapses until a power supply is actually turned on after a user performs a power supply turning-on manipulation, by controlling a power supply state so that: when power supply turned-on information on an external equipment connected over a transmission line is acquired with the power supply state set to an off state, the power supply state will be changed into a standby state; and when information on a power supply turning-on manipulation is acquired with the power supply state set to a standby state, the power supply state will be changed into an on state.

2. Description of the Related Art

In recent years, for example, the High Definition Multimedia Interface (HDMI) has prevailed as the specifications for a communication interface through which an uncompressed (baseband) digital video signal (image data) and a digital audio signal (audio data) accompanying the digital video signal are transmitted from a digital versatile disc (DVD) player, a settop box (STB), or any other audiovisual (AV) source to a television receiver, a projector, or any other display device.

The HDMI has the specifications for an audio transmission facility and a copyright protection facility added to the Digital Visual Interface (DVI), which is the standard specifications for connection of a personal computer (PC) and a display device, so as to cover an audiovisual (AV) equipment. For example, the HDMI specifications are detailed in non-patent document 1, that is, "High-definition Multimedia Interface Specification Version 1.3a" (Nov. 10, 2006).

In recent years, multiple cables for video, audio, and control signals have been employed in connection between equipments. However, according to the HDMI, only one cable is needed, and the control signal copes with bidirectional transmission. Therefore, for example, when the control signal is relayed from a television receiver to an output device connected over an HDMI cable, such as, a DVD player or a settop box, a remote control for the television receiver can be used to operate an entire AV system.

In the HDMI specifications, inter-equipment control using the Consumer Electronics Control (CEC) protocol is defined. According to the CEC, various controls can be implemented based on an inherent physical address and an inherent logical address that are assigned to each of equipments existent on an HDMI network. For example, when a user is watching a digital broadcast on a television receiver, if a DVD player connected over an HDMI cable is used to reproduce data, the television receiver autonomously selects an input terminal via which the DVD player is connected. In addition, a menu displayed by the DVD player or turning on or off of a power supply can be manipulated using a remote control for the television receiver.

SUMMARY OF THE INVENTION

Many existing CEC-compatible equipments take a relatively long time to start a CEC facility. Therefore, for example, in an AV system including a television receiver and a DVD player that are connected to each other over an HDMI cable, a long time is taken until the power supply of the DVD player is actually turned on after a user performs a power supply turning-on manipulation on a television receiver. This poses a problem in that it takes considerable time until an image and sounds reproduced by the DVD player are outputted from the television receiver.

Thus, it is desirable to shorten the time to be taken until a power supply is actually turned on after a user performs a power supply turning-on manipulation.

According to an embodiment of the present invention, there is provided an electronic equipment including a data transmission unit which transmits content data to an external equipment over a transmission line or receives the content data from the external equipment over the transmission line, a power supply turned-on information acquisition unit which acquires power supply turned-on information concerning the external equipment, an information-on-manipulation acquisition unit which acquires information on a power supply turning-on manipulation, and a power supply state control unit that controls a power supply state into any of an off state, a standby state, and an on state; when the power supply turned-on information concerning the external equipment is acquired by the power supply turned-on information acquisition unit with the power supply state set to the off state, the power supply state control unit changes the power supply state from the off state to the standby state; and when the information on the power supply turning-on manipulation is acquired by the information-on-manipulation acquisition unit with the power supply state set to the standby state, the power supply state control unit changes the power supply state from the standby state to the on state.

The electronic equipment in accordance with the embodiment of the present invention may be a transmitting apparatus or a receiving apparatus. In the case of the transmitting apparatus, a data transmission unit transmits content data (image data and audio data) to an external equipment over a transmission line. In this case, for example, the content data is transmitted to the external equipment in the form of differential signals on multiple channels, that is, along TMDS channels in a transmission line, for example, a HDMI cable.

In the case of the receiving apparatus, the data transmission unit receives the content data from the external equipment over the transmission line. In this case, the content data is received from the external equipment in the form of differential signals on multiple channels, that is, along the TMDS channels in the transmission line, for example, the HDMI cable.

According to the embodiment of the present invention, the power supply turned-on information acquisition unit acquires power supply turned-on information concerning an external equipment. The power supply turned-on information concerning the external equipment is information signifying that the power supply state of the external equipment will be changed to an on state because system start is in progress, or that the power supply state thereof has been changed into the on state because the system start has already been completed.

In the power supply turned-on information acquisition unit, power supply turned-on information on an external equipment is acquired based on, for example, a voltage change occurring in a predetermined line included in a transmission line. The predetermined line includes a facility that notifies the connected state of the external equipment according to, for example, a dc bias voltage (in an HPD line included in an HDMI cable). For example, when a power supply turning-on manipulation is performed on the external equipment, the external equipment has the power supply thereof turned on and has therefore the system thereof started. At this time, the voltage in the predetermined line is changed from, for example, a low level to a high level. In the power supply turned-on information acquisition unit, when the voltage change in the predetermined line is detected, the power supply turned-on information concerning the external equipment is acquired.

In the power supply turned-on information acquisition unit, the power supply state of the external equipment is queried over, for example, a control data line included in the transmission line. Based on a response to the query, the power supply turned-on information concerning the external equipment is acquired. For example, when the external equipment has the system thereof started, the response from the external equipment is a response signifying that the power supply of the external equipment is turned off. When the external equipment has the system start completed, the response from the external equipment is a response signifying that the power supply of the external equipment is turned on.

In the information-on-manipulation acquisition unit, for example, information on a power supply turning-on manipulation is acquired. The power supply turning-on manipulation is performed via, for example, the external equipment. In this case, in the information-on-manipulation acquisition unit, the information on the power supply turning-on manipulation is acquired over, for example, a control data line included in the transmission line. The power supply turning-on manipulation is performed by, for example, manipulating a user operating unit. In this case, in the information-on-manipulation acquisition unit, the information on the power supply turning-on manipulation is acquired based on the manipulation performed on the user operating unit.

The electronic equipment in accordance with the embodiment of the present invention has as a power supply state an off state, a standby state, and an on state. The off state is a state into which when a power supply turning-off manipulation is performed, the power supply of the electronic equipment is finally changed. The on state is a state into which when a power supply turning-on manipulation is performed, the power supply is finally changed. When the power supply turning-on manipulation is performed with the power supply state set to the off state, the electronic equipment initiates system start. When the system start is completed, the power supply state is finally set to the on state. The standby state is a state in an intermediate stage between the off state and on state, and is a state that takes a shorter time for being changed to the on state than for being changed to the off state.

According to the embodiment of the present invention, when the power supply turned-on information concerning the external equipment is acquired by the power supply turned-on information acquisition unit with the power supply state set to the off state, the power supply state is changed from the off state to the standby state by the power supply state control unit. When the information on a power supply turning-on manipulation is acquired by the information-on-manipulation acquisition unit with the power supply state set to the standby state, the power supply state is changed from the standby state to the on state by the power supply state control unit.

As mentioned above, when the power supply turned-on information on an external equipment is acquired, the power supply state is changed in advance from the off state to the standby state. Therefore, when the power supply turning-on manipulation is performed, the standby state is merely changed to the on state. The time elapsing until the power supply is actually turned on after a user performs the power supply turning-on manipulation can be shortened.

The electronic equipment of the embodiment of the present invention may further include an information-on-power supply turning-off manipulation acquisition unit that acquires information on a power supply turning-off manipulation. When the information on the power supply turning-off manipulation is acquired by the information-on-power supply turning-off manipulation acquisition unit with the power supply state set to the on state, the power supply state control unit may change the power supply state from the on state to the standby state. In this case, for example, assuming that the power supply turning-off manipulation is performed on the external equipment by mistake and the power supply turning-on manipulation is immediately performed on the external equipment, the standby state is merely changed to the on state. Therefore, the time elapsing until the power supply is actually turned on after a user performs the power supply turning-on manipulation can be shortened.

Now, for example, after the power supply state is changed into the standby state, although a predetermined time has elapsed, if the information-on-manipulation acquisition unit does not acquire the information on the power supply turning-on manipulation, the power supply state is changed from the standby state to the off state. When the power supply turning-off manipulation performed on the external equipment is no mistake, the power supply turning-on manipulation will not be immediately performed on the external equipment. In this case, the power supply can be prevented from being retained in the standby state. Eventually, unnecessary power consumption can be prevented.

According to the embodiment of the present invention, the power supply state is controlled so that: when the power supply turned-on information concerning the external equipment connected over the transmission line is acquired with the power supply state set to the off state, the off state will be changed to the standby state; and when the information on the power supply turning-on manipulation is acquired with the power supply state set to the standby state, the standby state will be changed to the on state. The time elapsing until the power supply is actually turned on after a user performs the power supply turning-on manipulation can be shortened.

BRIEF DESCRIPTION OF THE DRAWINGS

FIG. 8 is a diagram showing a pin configuration (type A) of an HDMI terminal to which an HDMI cable of each of the source equipment and the sink equipment is spliced;

FIG. 11 is a diagram showing a list of events of which the power supply managing state machine is notified by the HPD detecting state machine or sink power supply monitoring state machine;

FIG. 12 is an HPD detecting state chart for use in explaining the action of the HPD detecting state machine;

FIG. 13 is a sink power supply monitoring state chart for use in explaining the action of the sink power supply monitoring state machine;

DESCRIPTION OF THE PREFERRED EMBODIMENTS

Figure 1:
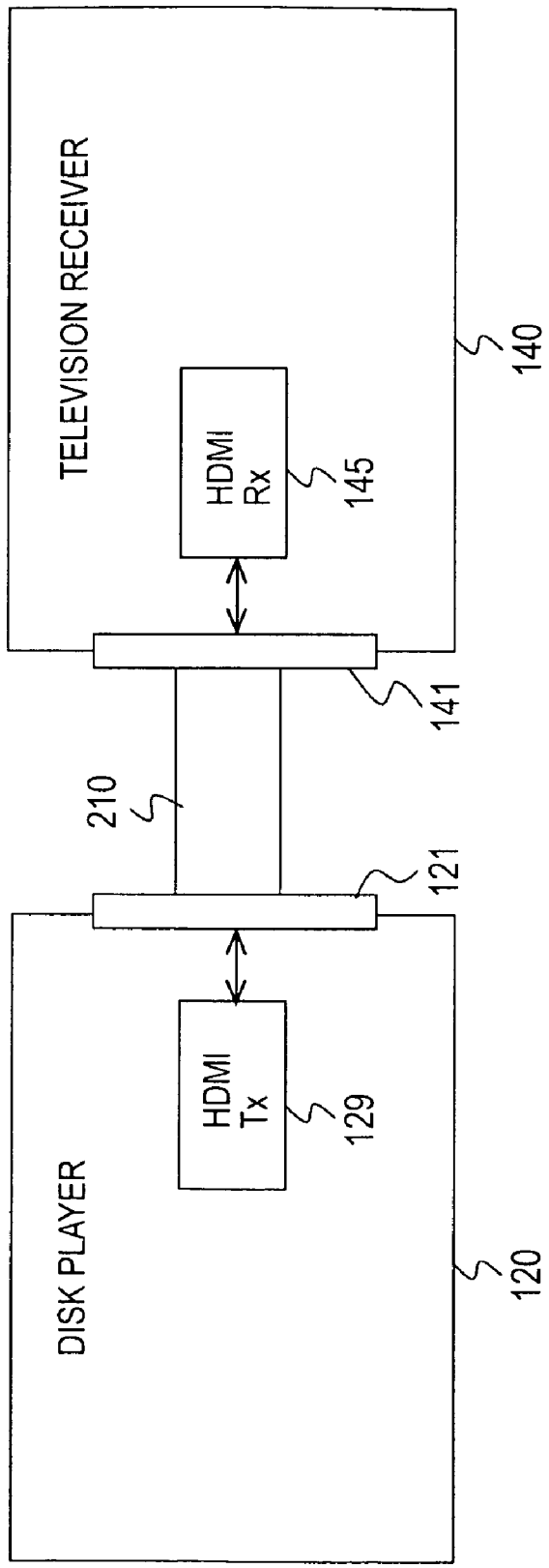
FIG. 1 is a block diagram showing an example of the constitution of an AV system of an embodiment of the present invention is adapted.

Referring to the drawings, an embodiment of the present invention will be described below. FIG. 1 shows an example of the constitution of an audiovisual (AV) system 100 to which the embodiment is adapted. The AV system 100 includes a disk player 120 serving as a source equipment and a television receiver 140 serving as a sink equipment.

The disk player 120 and television receiver 140 are connected to each other over an HDMI cable 210. The disk player 120 is provided with an HDMI terminal 121 to which an HDMI transmitting unit (HDMITX) 129 is connected. The television receiver 140 is provided with an HDMI terminal 141 to which an HDMI receiving unit (HDMIRX) 145 is connected. One end of the HDMI cable 210 is spliced to the HDMI terminal 121 of the disk player 120, and the other end of the HDMI cable 210 is spliced to the HDMI terminal 141 of the television receiver 140.

Figure 2:
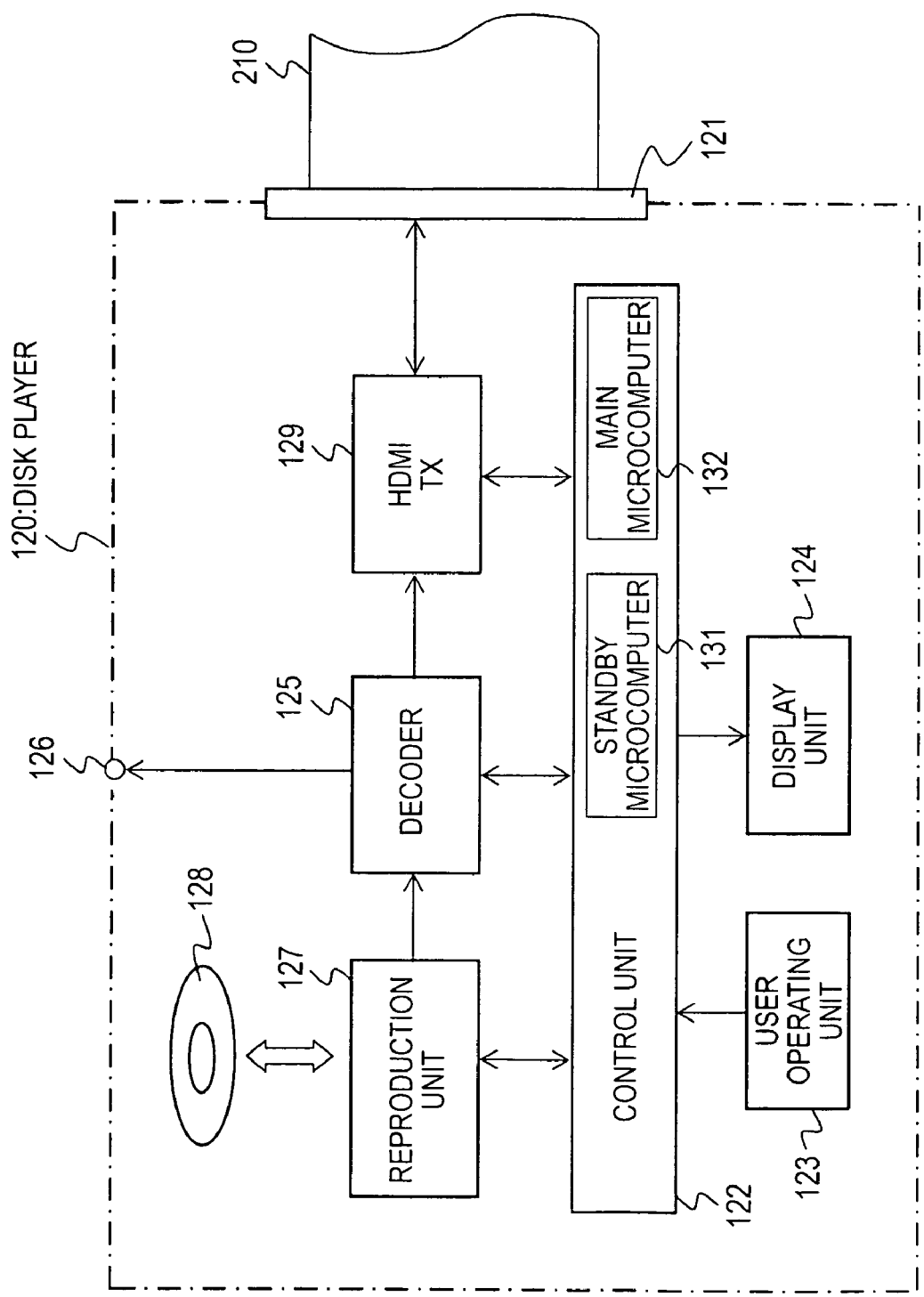
FIG. 2 is a block diagram showing an example of the constitution of a disk player (source equipment) included in the AV system.

FIG. 2 shows an example of the constitution of the disk player 120. The disk player 120 includes the HDMI terminal 121, a control unit 122, a user operating unit 123, a display unit 124, a decoder 125, an output terminal 126, a reproduction unit 127, and an HDMI transmitting unit (HDMI source) 129.

The control unit 122 controls the actions of the respective components of the disk player 120. The user operating unit 123 and display unit 124 constitute a user interface and are connected to the control unit 122. The user operating unit 123 includes keys, buttons, and a dial disposed on a housing of the disk player 120 that is not shown, or includes a touch panel or the like disposed on the display surface of the display unit 124. The display unit 124 includes a display panel realized with a liquid crystal display or the like.

The reproduction unit 127 reproduces encoded data from a disk-like recording medium 128 such as a DVD, and feeds the data to the decoder 125. The encoded data is compressed coded data produced by encoding image data and audio data, which accompanies the image data, according to, for example, the Moving Picture Experts Group (MPEG) method or the like.

The decoder 125 decodes encoded data, which is fed from the reproduction unit 127, into uncompressed (baseband) image and audio data items according to the MPEG method or the like, feeds the uncompressed image and audio data items to the HDMI transmitting unit (HDMI source) 129, and outputs the uncompressed image and audio data items through the output terminal 126.

The HDMI transmitting unit 129 is connected to the HDMI terminal 121. The HDMI transmitting unit 129 uni-directionally transmits the uncompressed image and audio data items, which are fed from the decoder 125, to the television receiver 140 through the HDMI terminal 121 over the HDMI cable 210 through communication conformable to the HDMI. The HDMI transmitting unit 129 will be detailed later.

Figure 3:
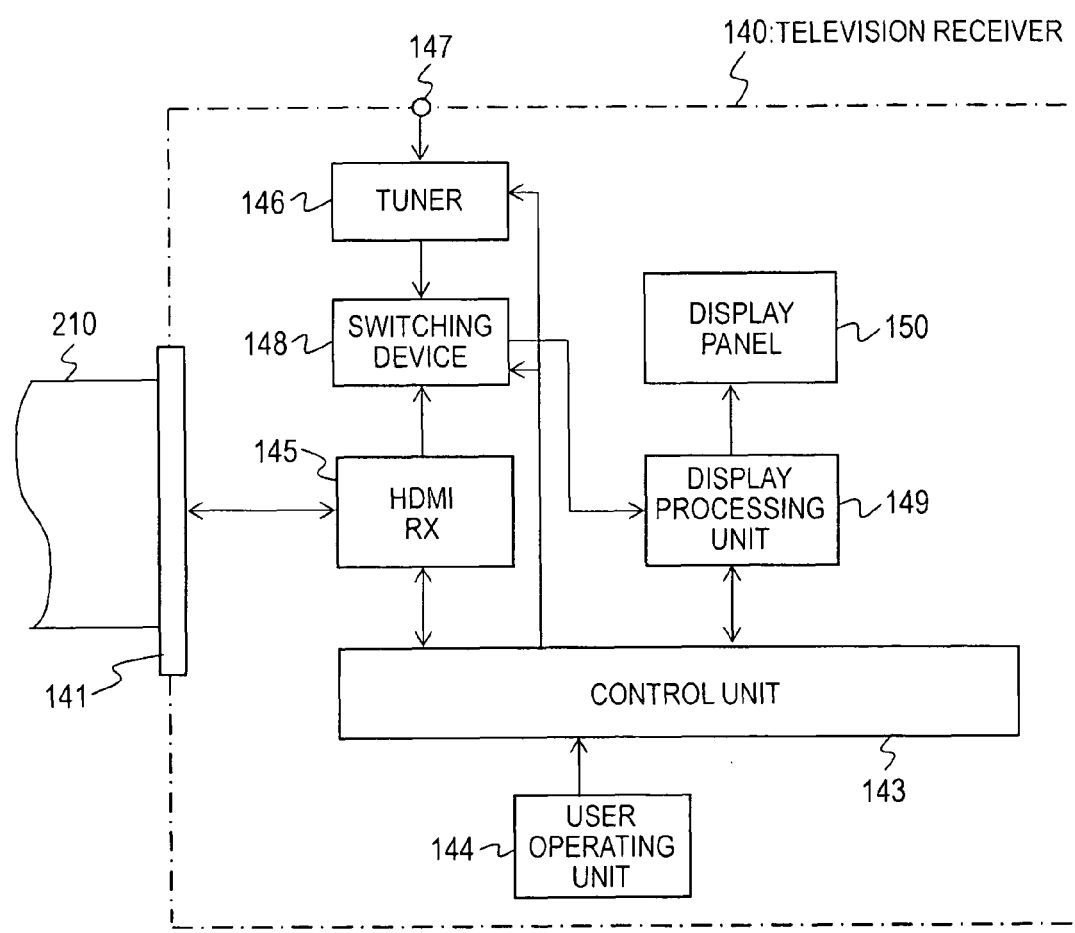
FIG. 3 is a block diagram showing an example of the constitution of a television receiver (sink equipment) included in the AV system.

FIG. 3 shows an example of the constitution of the television receiver 140. The television receiver 140 includes the HDMI terminal 141, a control unit 143, a user operating unit 144, an HDMI receiving unit (HDMI sink) 145, a tuner 146, an antenna terminal 147, a switching device 148, a display processing unit 149, and a display panel 150.

The control unit 143 controls the actions of the respective components of the television receiver 140. The user operating unit 144 realizes a user interface and is connected to the control unit 143. The user operating unit 144 includes keys, buttons, and a dial that are disposed on a housing of the television receiver 140 which is not shown, or is realized with a remote control.

The HDMI receiving unit 45 is connected to the HDMI terminal 141. The HDMI receiving unit 145 receives uncompressed image and audio data items, which are uni-directionally transmitted from the HDMI transmitting unit 129 included in the disk player 120 connected over the HDMI cable 210, through communication conformable to the HDMI. The HDMI receiving unit 145 feeds the received image data to the switching device 148. The audio data received by the HDMI receiving unit 145 is fed to an audio data switching device that is not shown. The HDMI receiving unit 145 will be detailed later.

The tuner 146 receives a BS digital broadcast, a terrestrial digital broadcast, or the like. A broadcast signal caught by an antenna that is not shown and connected to the antenna terminal 147 is fed to the tuner 146. Based on the broadcast signal, the tuner 146 acquires image data (video signal) and audio data that represent a predetermined program. The switching device 148 selectively fetches image data received by the HDMI receiving unit 145 or image data acquired by the tuner 146.

The display processing unit 149 performs color adjustment, contour enhancement, superposition of graphic data, or any other processing on the image data fetched by the switching device 148. The display panel 150 displays an image represented by the image data processed by the display processing unit 149. The display panel 150 is formed with, for example, a liquid crystal display (LCD), an organic electroluminescent (EL) display, a plasma display panel (PDP), or the like.

Figure 4:
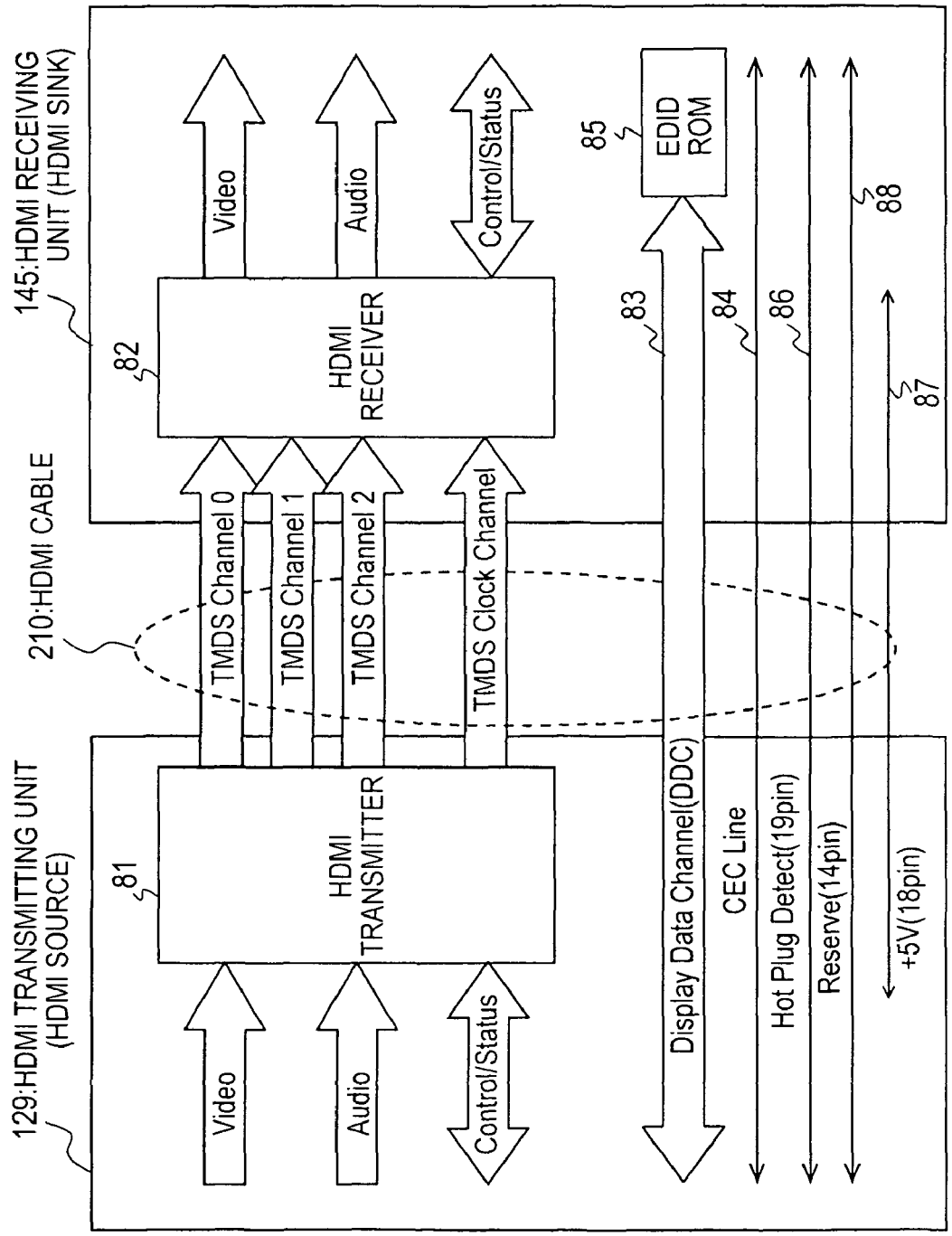
FIG. 4 is a block diagram showing an example of the constitutions of an HDMI transmitting unit (HDMI source) and an HDMI receiving unit (HDMI sink)

FIG. 4 shows an example of the constitutions of the HDMI transmitting unit (HDMI source) 129 of the disk player 120 and the HDMI receiving unit (HDMI sink) 145 of the television receiver 140 which are included in the AV system 100 shown in FIG. 1.

The HDMI transmitting unit 129 uni-directionally transmits differential signals, which represent uncompressed pixel data items of an image for one screen, to the HDMI receiving unit 145 on multiple channels during an effective image period (hereinafter, may be called an active video period) that is a period obtained by removing both a horizontal blanking period and a vertical blanking period from a period that begins with one vertical synchronizing (hereinafter, sync) signal and ends with the next vertical sync signal. In addition, the HDMI transmitting unit 129 uni-directionally transmits differential signals, which represent at least audio data accompanying the image, control data, and other auxiliary data, to the HDMI receiving unit 145 on multiple channels during the horizontal blanking period or vertical blanking period.

The HDMI transmitting unit 129 includes an HDMI transmitter 81. The HDMI transmitter 81 converts, for example, uncompressed pixel data items of an image into representative differential signals, and uni-directionally serially transmits the differential signals to the HDMI receiving unit 145, which is connected over the HDMI cable 210, along three TMDS channels 0, 1, and 2 that physically realize multiple channels.

The HDMI transmitter 81 converts audio data accompanying uncompressed image data, necessary control data, and other auxiliary data into representative differential signals, and uni-directionally serially transmits the differential signals to the HDMI receiving unit 145, which is connected over the HDMI cable 210, along three TMDS channels 0, 1, and 2.

Further, the HDMI transmitter 81 transmits pixel clocks, which are synchronous with pixel data items to be transmitted along the three TMDS channels 0, 1, and 2, to the HDMI receiving unit 145, which is connected over the HDMI cable 210, along a TMDS clock channel. Herein, along one TMDS channel i (i denotes 0, 1, or 2), pixel data of 10 bits long is transmitted during the duration of one pixel clock.

The HDMI receiving unit 145 receives differential signals, which represent pixel data and are uni-directionally transmitted from the HDMI transmitting unit 129 on the multiple channels, during the active video period. In addition, during the horizontal blanking period or vertical blanking period, the HDMI receiving unit 145 receives differential signals that represent audio data and control data and are uni-directionally transmitted from the HDMI transmitting unit 129 on the multiple channels.

Namely, the HDMI receiving unit 145 includes an HDMI receiver 82. The HDMI receiver 82 receives differential signals, which represent pixel data items and are uni-directionally transmitted along the TMDS channels 0, 1, and 2 from the HDMI transmitting unit 129 connected over the HDMI cable 210, and differential signals, which represent audio data and control data, synchronously with pixel clocks transmitted along the TMDS clock channel from the HDMI transmitting unit 129.

The transmission channels included in an HDMI system composed of the HDMI transmitting unit 129 and HDMI receiving unit 145 include, in addition to the three TMDS channels 0, 1, and 2 that are transmission channels along which pixel data items and audio data are uni-directionally serially transmitted from the HDMI transmitting unit 129 to the HDMI receiving unit 145 synchronously with the pixel clocks, and the TMDS clock channel that is a transmission channel along which the pixel clocks are transmitted, transmission channels called a display data channel (DDC) 83 and a CEC line 84.

The DDC 83 is composed of two signal lines that are not shown and that are included in the HDMI cable 210. The HDMI transmitting unit 129 uses the DDC 83 to read enhanced extended display identification data (E-EDID) from the HDMI receiving unit 145 connected over the HDMI cable 210.

The HDMI receiving unit 145 includes, aside from the HDMI receiver 82, an EDID read-only memory (ROM) 85 in which E-EDID that is performance information concerning the own performance (configuration/capability) is stored. The HDMI transmitting unit 129 reads the E-EDID concerning the HDMI receiving unit 145 from the HDMI receiving unit 145, which is connected over the HDMI cable 210, along the DDC 83 in response to a request sent from the control unit 122. The HDMI transmitting unit 129 transmits the read E-EDID to the control unit 122.

Based on the E-EDID, the control unit 122 recognizes the configuration of the HDMI receiving unit 145 expressing the performance thereof. For example, the control unit 122 recognizes a format (profile) for an image which the electronic equipment including the HDMI receiving unit 145 supports, for example, an RGB,YCbCr-4:4:4 format or a YCbCr-4:4:2 format.

The CEC line 84 is formed with one signal line that is not shown and that is included in the HDMI cable 210, and acts as a control data line. The CEC line 84 is used to bi-directionally communicate control data between the HDMI transmitting unit 129 and HDMI receiving unit 145.

The HDMI cable 210 includes an HPD line 86 to be spliced to a pin called a Hot Plug Detect (HPD) pin. The source equipment utilizes the HPD line 86 so as to detect connection of the sink equipment. In addition, the HDMI cable 210 includes a power line 87 to be used to feed power from the source equipment to the sink equipment. Further, a reserved line 88 is included in the HDMI cable 210.

Figure 5:
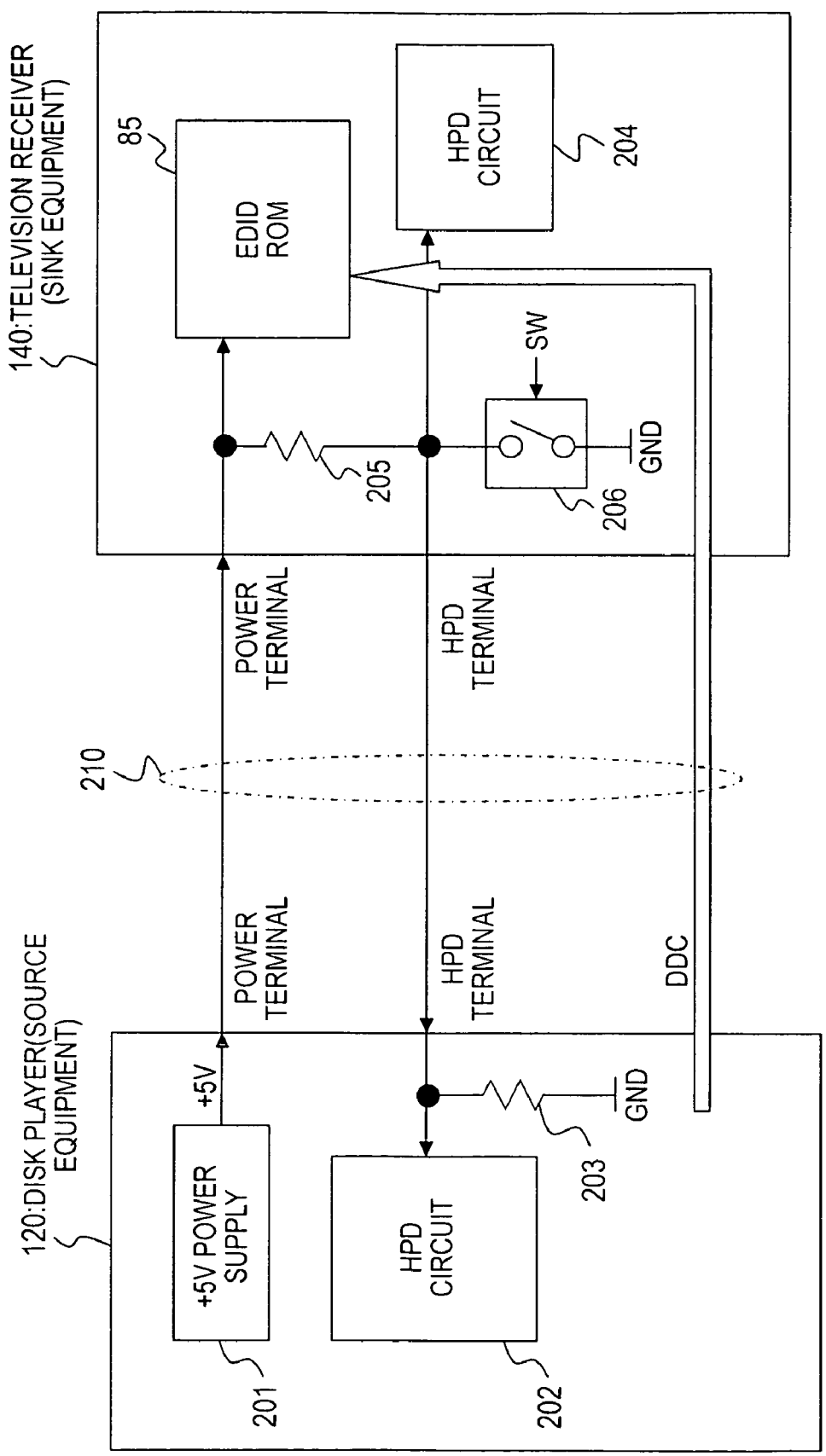
FIG. 5 is a diagram schematically showing peripheral circuits of a power terminal (+5V power terminals) and a Hot Plug Detect (HPD) terminal respectively in each of the disk player serving as a source equipment and the television receiver serving as a sink equipment.

FIG. 5 schematically shows peripheral circuits of a power (+5 V power) terminal and a Hot Plug Detect (HPD) terminal respectively in each of the disk player 120 serving as the source equipment and the television receiver 140 serving as the sink equipment.

The disk player 120 includes a power supply 201 that generates power of +5 V and feeds the power to the foregoing power terminal, and an HPD circuit 202 connected to the HPD terminal. The HPD terminal of the disk player 120 is grounded via, for example, a pull-down resistor 203 offering 47 kΩ.

The television receiver 140 includes an HPD circuit 204 connected to an HPD terminal. In the television receiver 140, readout power is fed to an EDID ROM 85 through a power terminal. In the television receiver 140, a resistor 205 that offers 1 kΩ as stipulated in the specifications is connected between the power terminal and HPD terminal. The HPD terminal is grounded via a connection switch 206.

In the foregoing constitution, when the disk player 120 and television receiver 140 are connected to each other over the HDMI cable 210, the potential at the HPD terminal of the television receiver 140 rises due to power of +5 V fed from the power supply 201 in the disk player 120. Therefore, the HPD circuit 204 in the television receiver 140 detects the fact that the source equipment (the disk player 120 in the present embodiment) has been connected to the television receiver 140 over the HDMI cable 210.

At this time, the potential at the HPD terminal of the disk player 120 also rises. Therefore, the HPD circuit 202 in the disk player 120 detects the fact that the sink equipment (the television receiver 140 in the present embodiment) has been connected to the disk player 120 over the HDMI cable 210.

In this state, for example, when the HDMI cable 210 is uncoupled from the television receiver 140, the potentials at the HPD terminal of the television receiver 140 and the HPD terminal of the disk player 120 fall. The HPD circuit 204 in the television receiver 140 and the HPD circuit 202 in the disk player 120 detect the fact that the HDMI cable 210 has been uncoupled.

When the disk player 120 and television receiver 140 are connected to each other over the HDMI cable 210, if a power supply turning-on manipulation is performed on the television receiver 140, the connection switch 206 is retained in an on state for a predetermined time on the basis of a control signal SW fed from the control unit 143. A voltage on the HPD line (HPD signal) is therefore changed from a low level to a high level. Accordingly, the HPD circuit 202 in the disk player 120 detects the fact that the power supply turning-on manipulation has been performed on the television receiver 140.

Figure 6:
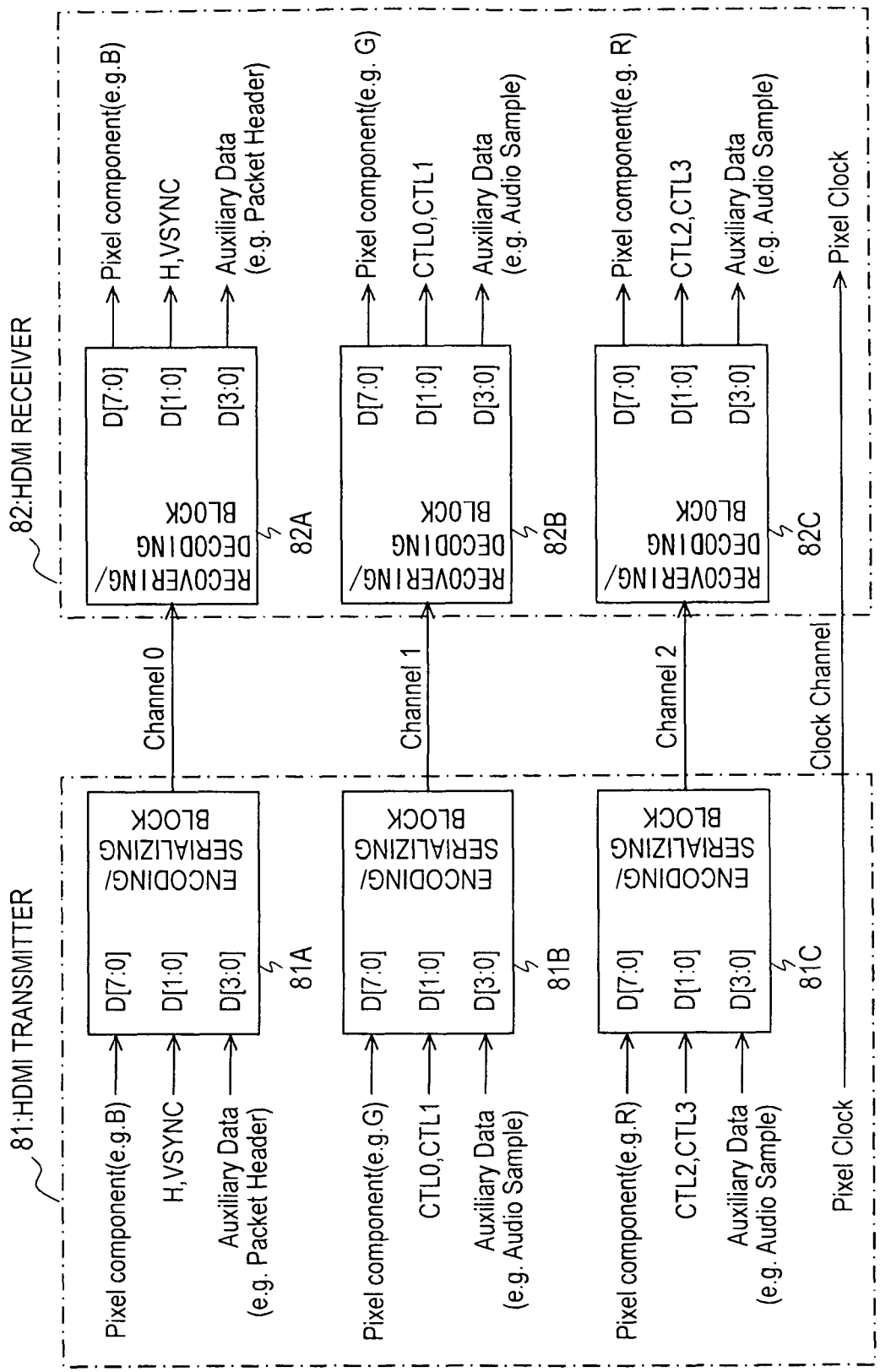
FIG. 6 is a block diagram showing an example of the constitutions of an HDMI transmitter included in the HDMI transmitting unit and an HDMI receiver included in the HDMI receiving unit.

FIG. 6 shows an example of the constitutions of the HDMI transmitter 81 and HDMI receiver 82 shown in FIG. 4.

The HDMI transmitter 81 includes three encoding/serializing blocks 81A, 81B, and 81C associated with the three TMDS channels 0, 1, and 2. The encoding/serializing blocks 81A, 81B, and 81C encode image data, auxiliary data, and control data that are fed to the blocks, convert parallel data into serial data, and transmit the serial data in the form of differential signals. If the image data includes three components of, for example, red (R), green (G), and blue (B), the B component is fed to the encoding/serializing block 81A, the G component is fed to the encoding/serializing block 81B, and the R component is fed to the encoding/serializing block 81C.

As the auxiliary data, for example, audio data and a control packet are provided. The control packet is fed to, for example, the encoding/serializing block 81A. The audio data is fed to the encoding/serializing blocks 81B and 81C.

Further, as the control data, a vertical sync signal (VSYNC) of one bit long, a horizontal sync signal (HSYNC) of one bit long, and 1-bit control bits CTL0, CTL1, CTL2, and CTL3 are provided. The vertical sync signal and horizontal sync signal are fed to the encoding/serializing block 81A. The control bits CTL0 and CTL1 are fed to the encoding/serializing block 81B, and the control bits CTL2 and CTL3 are fed to the encoding/serializing block 81C.

The encoding/serializing block 81A transmits on a time-sharing basis the B component of the image data, the vertical sync signal and horizontal sync signal, and the auxiliary data that are fed thereto. Specifically, the encoding/serializing block 81A converts the fed B component of the image data into parallel data in units of a fixed number of bits, that is, eight bits. The encoding/serializing block 81A encodes the parallel data so as to convert the parallel data into serial data, and transmits the serial data along the TMDS channel 0.

The encoding/serializing block 81A encodes parallel data of two bits long, which represents the fed vertical sync signal and horizontal sync signal, so as to convert the parallel data into serial data, and transmits the serial data along the TMDS channel 0. Further, the encoding/serializing block 81A converts the fed auxiliary data into parallel data in units of four bits. The encoding/serializing block 81A encodes the parallel data so as to convert the parallel data into serial data, and transmits the serial data along the TMDS channel 0.

The encoding/serializing block 81B transmits on a time-sharing basis the G component of the image data, the control bits CTL0 and CTL1, and the auxiliary data that are fed thereto. Specifically, the encoding/serializing block 81B converts the fed G component of the image data into parallel data in units of a fixed number of bits, that is, eight bits. The encoding/serializing block 81B encodes the parallel data so as to convert the parallel data into serial data, and transmits the serial data along the TMDS channel 1.

The encoding/serializing block 81B encodes parallel data of two bits long, which includes the fed control bits CTL0 and CTL1, so as to convert the parallel data into serial data, and transmits the serial data along the TMDS channel 1. The encoding/serializing block 81B converts the fed auxiliary data into parallel data in units of four bits. The encoding/serializing block 81B encodes the parallel data so as to convert the parallel data into serial data, and transmits the serial data along the TMDS channel 1.

The encoding/serializing block 81C transmits on a time-sharing basis the R component of the image data, the control bits CTL2 and CTL3, and the auxiliary data that are fed thereto. Specifically, the encoding/serializing block 81C converts the fed R component of the image data into parallel data in units of a fixed number of bits, that is, eight bits. Further, the encoding/serializing block 81C encodes the parallel data so as to convert the parallel data into serial data, and transmits the serial data along the TMDS channel 2.

The encoding/serializing block 81C encodes parallel data of two bits long, which includes the fed control bits CTL2 and CTL3, so as to convert the parallel data into serial data, and transmits the serial data along the TMDS channel 2. Further, the encoding/serializing block 81C converts the fed auxiliary data into parallel data in units of four bits. The encoding/serializing block 81C encodes the parallel data so as to convert the parallel data into serial data, and transmits the serial data along the TMDS channel 2.

The HDMI receiver 82 includes three recovering/decoding blocks 82A, 82B, and 82C associated with the three TMDS channels 0, 1, and 2. The recovering/decoding blocks 82A, 82B, and 82C receive image data, auxiliary data, and control data transmitted in the form of differential signals along the TMDS channels 0, 1, and 2. Further, the recovering/decoding blocks 82A, 82B, and 82C convert the image data, auxiliary data, and control data from serial data into parallel data, decode the parallel data, and output the resultant data.

Specifically, the recovering/decoding block 82A receives the B component of the image data, the vertical sync signal and horizontal sync signal, and the auxiliary data that are transmitted in the form of differential signals along the TMDS channel 0. The recovering/decoding block 82A converts the B component of the image data, the vertical sync signal and horizontal sync signal, and the auxiliary data from serial data items into parallel data items, decodes the parallel data items, and outputs the resultant data items.

The recovering/decoding block 82B receives the G component of the image data, the control bits CTL0 and CTL1, and auxiliary data that are transmitted in the form of differential signals along the TMDS channel 1. The recovering/decoding block 82B converts the G component of the image data, the control bits CTL0 and CTL1, and the auxiliary data from serial data items into parallel data items, decodes the parallel data, and outputs the resultant data items.

The recovering/decoding block 82C receives the R component of the image data, the control bits CTL2 and CTL3, and the auxiliary data that are transmitted in the form of differential signals along the TMDS channel 2. The recovering/decoding block 82C converts the R component of the image data, the control bits CTL2 and CTL3, and the auxiliary data from serial data items into parallel data items, decodes the parallel data items, and outputs the resultant data items.

Figure 7:
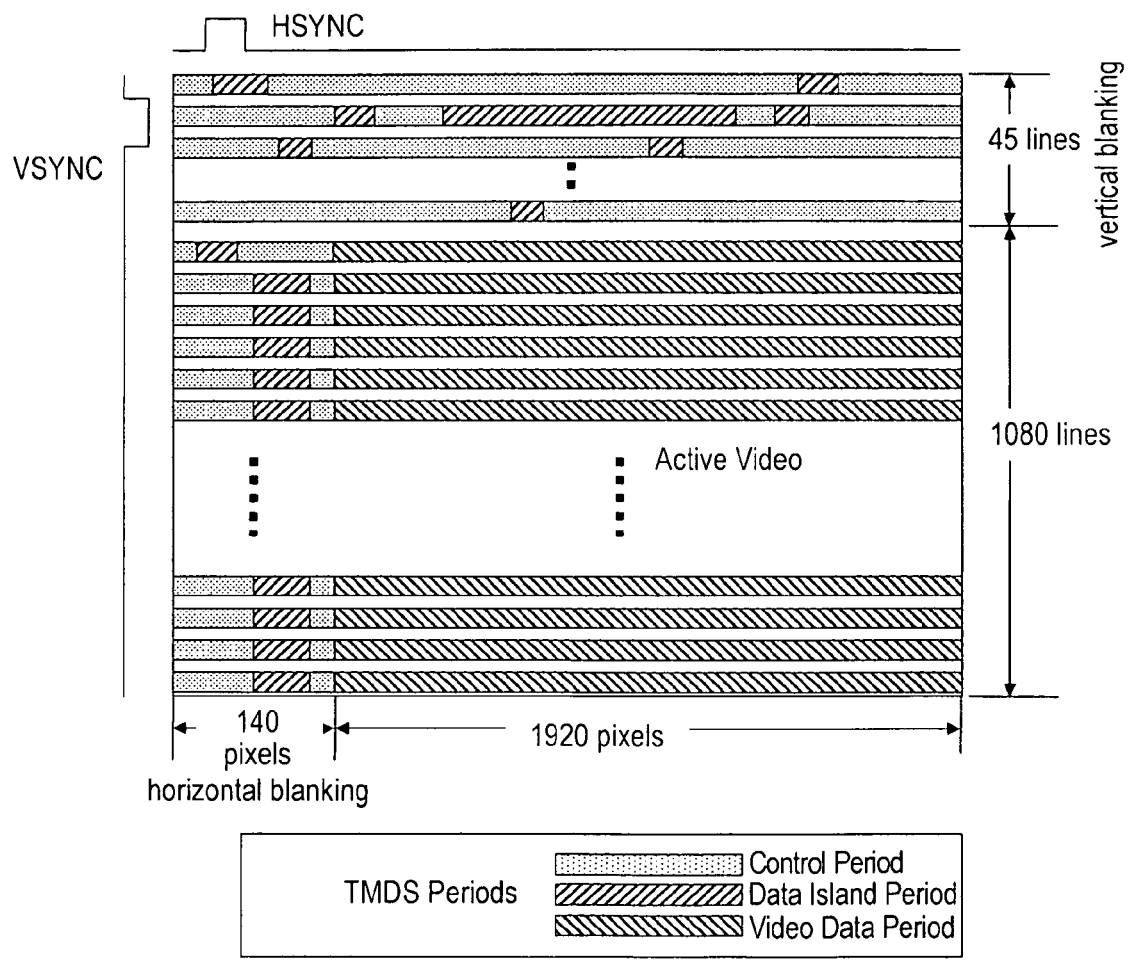
FIG. 7 is a diagram showing an example of the structure of TMDS transmission data (a case where image data representing 1920 pixels sideways and 1080 lines lengthwise is transmitted)

FIG. 7 shows an example of the structure of TMDS transmission data. FIG. 7 shows periods of various transmission data items adopted in a case where image data having 1920 pixels sideways and 1080 lines lengthwise is transmitted along the TMDS channels 0, 1, and 2.

A video field during which transmission data items are transmitted along the three TMDS channels 0, 1, and 2 in the HDMI cable includes three periods of a video data period, a data island period, and a control period which are associated with the types of transmission data items.

The video field is a period from the leading edge (active edge) of a certain vertical sync signal to the leading edge of the next vertical sync signal, and falls into a horizontal blanking period, a vertical blanking period, and an active video period that is a period obtained by removing the horizontal blanking period and vertical blanking period from the video field.

The video data period is allocated to the active video period. During the video data period, data of effective (active) pixels, which number the product of 1920 pixels by 1080 lines and constitute uncompressed image data for one screen, is transmitted.

The data island period and control period are assigned to the horizontal blanking period and vertical blanking period. During the data island period and control period, auxiliary data is transmitted. In other words, the data island period is assigned to parts of the horizontal blanking period and vertical blanking period. During the data island period, for example, an audio data packet that is auxiliary data unrelated to control is transmitted.

The control period is assigned to the other parts of the horizontal blanking period and vertical blanking period. During the control period, for example, a vertical sync signal, a horizontal sync signal, and a control packet that are auxiliary data items related to control are transmitted.

FIG. 8 shows an example of the pin configurations of the HDMI terminals 121 and 141. The pin configurations shown in FIG. 8 are of type A.

Two lines or differential lines over which differential signals TMDS Data i+ and TMDS Data i− are transmitted and which realize a TMDS channel i are spliced to a pin (pin number 1, 4, or 7) to which TMDS data i+ is assigned, and a pin (pin number 3, 6, or 9) to which TMDS data i− is assigned.

The CEC line 84 over which a CEC signal that is data to be used for control is spliced to a pin whose pin number is 13. A pin whose pin number is 14 is an unused (reserved) pin. A line over which a serial data (SDA) signal such as E-EDID is transmitted is spliced to a pin whose pin number is 16. A line over which a serial clock (SCL) signal that is a clock signal to be used for synchronization of transmission or reception of the SDA signal is transmitted is spliced to a pin whose pin number is 15. The aforesaid DDC 83 is realized with the line over which the SDA signal is transmitted and the line over which the SCL signal is transmitted.

The HPD line 86 which the source equipment uses, as mentioned above, to detect connection of the sink equipment is spliced to a pin whose pin number is 19. The power line 87 over which power is, as mentioned above, fed is spliced to a pin whose pin number is 18.

An example of actions to be performed in the AV system 100 shown in FIG. 1 will be described below. To begin with, an example of actions to be performed when the television receiver 140 is connected to the DVD recorder 120 over the HDMI cable 210 in order to construct the system.

Power is fed from the DVD player 120 to the television receiver 140 over the power line 87 (see FIG. 4) in the HDMI cable 210. Therefore, the voltage applied to the 19 pin in the HDMI terminal 141 of the television receiver 140 rises, and the voltage applied to the 19 pin in the HDMI terminal 121 of the DVD player 120 also rises.

The control unit 122 (HPD circuit 202) in the DVD player 120 monitors the voltage applied to the 19 pin in the HDMI terminal 121. When the voltage rises, the control unit 122 recognizes that the television receiver 140 has been connected to the DVD player 120 over the HDMI cable 210. The control unit 122 uses the DDC 83 in the HDMI cable 210 to read E-EDID stored in the EDID ROM 85 in the television receiver 140, and identifies the configuration or performance of the television receiver 140.

Next, an example of actions to be performed after the system is constructed will be described. For example, when a user operates the disk player 120 for reproduction, the disk player 120 (see FIG. 2) initiates reproduction, and the television receiver 140 (see FIG. 3) switches the input terminals to select the HDMI terminal.

In this case, in the disk player 120, the reproduction unit 127 reproduces encoded data from the disk-like recording medium 128, and feeds the data to the decoder 125. The decoder 125 decodes the encoded data, which is reproduced by the reproduction unit 127, into uncompressed image and audio data items. The data items are fed to the HDMI transmitting unit 129. In the HDMI transmitting unit 129, the uncompressed image and audio data items fed from the decoder 125 are uni-directionally transmitted to the television receiver 140 over the HDMI cable 210 through communication conformable to the HDMI.

In the television receiver 140, the HDMI receiving unit 145 receives baseband image and audio data items, which are uni-directionally transmitted from the HDMI transmitting unit 129 in the disk player 120 over the HDMI cable 210, through communication conformable to the HDMI.

The image data received by the HDMI receiving unit 145 is fed to the display processing unit 149 via the switching device 148. The display processing unit 149 performs color adjustment, contour enhancement, superposition of graphic data, and other processing on the image data under the control of the control unit 143. An image represented by the image data fed from the display processing unit 149 is then displayed on the display panel 150.

The audio data received by the HDMI receiving unit 145 is fetched from a switching device for audio data which is not shown, converted into an analog signal by a D/A converter, and then fed to a loudspeaker. Sounds associated with the image displayed on the display panel 150 are outputted through the loudspeaker.

Next, control of a power supply state by the disk player 120 will be described. The disk player 120 supports as the power supply state an off state, a standby state, and an on state. In the disk player 120, control of the power supply state is implemented by the control unit 122.

The off state is a state to which when a power supply turning-off manipulation is performed, the power supply state is finally changed. The on state is a state to which when a power supply turning-on manipulation is performed, the power supply state is finally changed. When the power supply turning-on manipulation is performed with the power supply state set to the off state, the electronic equipment initiates system start. When the system start is completed, the power supply state is finally changed to the on state. The standby state is a state in an intermediate stage between the off state and on state, and is a state that takes a shorter time for being changed to the on state than for being changed to the off state.

Figure 9:
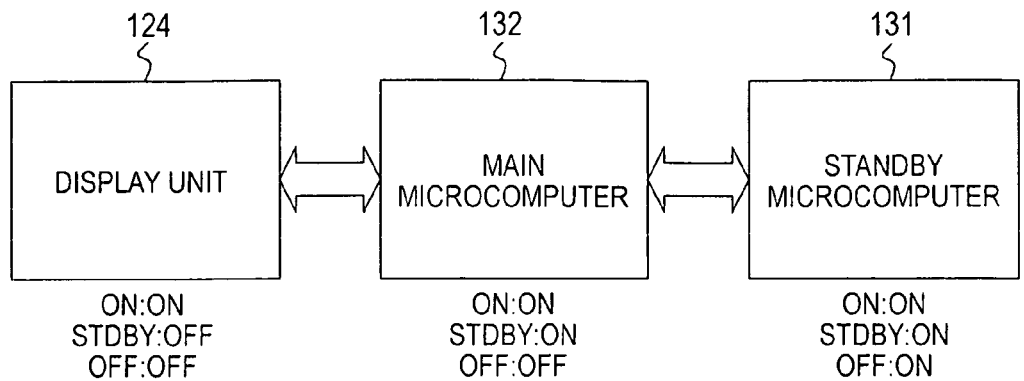
FIG. 9 is a diagram showing the operating states of a standby microcomputer and a main microcomputer (digital microcomputer), which are included in a control unit of the disk player, attained with the power supply state set to an off state, a standby state, or an on state.

The control unit 122 includes a standby microcomputer 131 and a main microcomputer (digital microcomputer) 132. The standby microcomputer 131 starts with the main power supply (ACON) turned on. As shown in FIG. 9, when the power supply state is any of the off state, standby state, and on state, the standby microcomputer is placed in a started state (on state) all the time. The standby microcomputer 131 manages the power supply state.

The main microcomputer 132 controls the components of the disk player 120. As shown in FIG. 9, when the power supply state is set to the standby state or on state, the main microcomputer 132 is placed in a started state (on state). The main microcomputer 132 takes a relatively long time to start up.

The states of the components of the disk player 120 attained with the power supply state set to the standby state are nearly identical to those attained with the power supply state set to the on state except that the display unit 124 is, as shown in FIG. 9, de-energized or placed in a display off state, and an output muting facility is energized or placed in an on state. Therefore, when the power supply state is set to the standby state, the disk player 120 can change the standby state to the on state for a short period of time.

Figure 10:
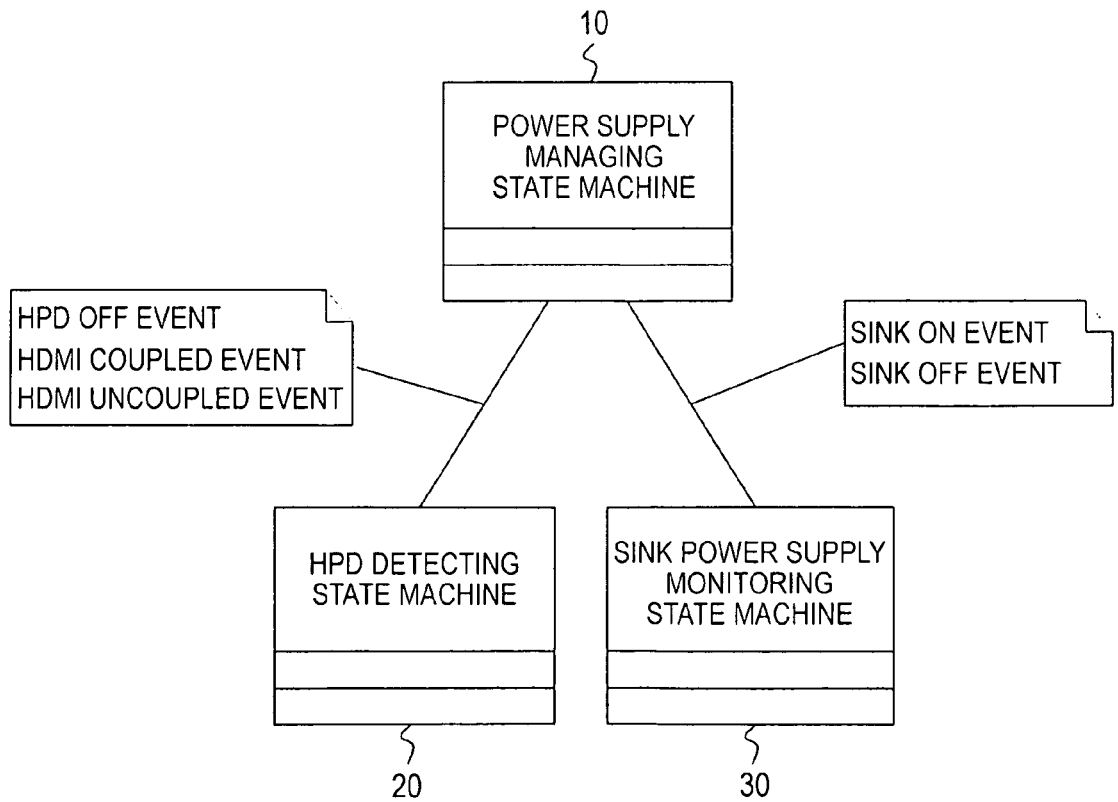
FIG. 10 is a diagram showing the static structures of state machines included in the standby microcomputer (a power supply managing state machine, an HPD detecting state machine, and a sink power supply monitoring state machine)

Management of the power supply state by the standby microcomputer 131 will be described below. The standby microcomputer 131 includes, as shown in FIG. 10, a power supply managing state machine 10, an HPD detecting state machine 20, and a sink power supply monitoring state machine 30. The power supply managing state machine 10 is a state machine that manages the power supply state. The HPD detecting state machine 20 is a state machine that senses a change in a voltage in the HPD line (HPD signal). The sink power supply monitoring state machine 30 is a state machine that regularly polls the power supply state of the sink equipment.

The power supply managing state machine 10 changes the power supply state in response to an event notification sent from the HPD detecting state machine 20 or sink power supply monitoring state machine 30. The HPD detecting state machine 20 and sink power supply monitoring state machine 30 are independent of each other. A notified event may be ignored depending on the state of the power supply managing state machine 10.

The HPD detecting state machine 20 generates any of three kinds of event notifications HPD Off Event, HDMI Coupled Event, and HDMI Uncoupled Event, and transmits the generated event notification to the power supply managing state machine 10. The sink power supply monitoring state machine 30 generates either of two kinds of event notifications Sink On Event and Sink Off Event, and transmits the generated event notification to the power supply managing state machine 10.

FIG. 11 shows a list of events of which the power supply managing state machine 10 is notified. In the list, in addition to the events brought about by the HPD detecting state machine 20 and sink power supply monitoring state machine 30, a Power Supply Turned On event and a Power Supply Turned Off event are recorded. The events are events that are notified by the standby microcomputer 131 when a user performs a power supply turning-on manipulation.

The standby microcomputer 131 acquires information on a power supply turning-on manipulation and generates a notification Power Supply Turned On Event. Likewise, the standby microcomputer 131 acquires information on a power supply turning-off manipulation and brings about the Power Supply Turned Off event. A user can perform the manipulation of turning on or off the power supply of the disk player 120 by manipulating the user operating unit 123. In this case, the standby microcomputer 131 acquires the information on the power supply turning-on or turning-off manipulation on the basis of the manipulation performed on the user operating unit 123.

When a power supply interlocking facility using the CEC line in the HDMI cable is energized, a user can perform the manipulation of turning on or off the power supply of the disk player 120 by performing the manipulation of turning on or off the power supply of the television receiver 140. In this case, Power On or Power Off is transmitted as User Control Pressed information from the television receiver 140 to the disk player 120 over the CEC line in the HDMI cable 210. In this case, the standby microcomputer 131 acquires the information on the power supply turning-on or tuning-off manipulation over the CEC line.

When a remote control pass-through facility is energized, a user can use a remote control for the television receiver 140 to perform a manipulation of turning on or off the power supply of the disk player 120. In this case, a remote-control command saying that the manipulation of turning on or off the power supply of the disk player 120 has been performed is transmitted from the television receiver 140 to the disk player 120 over the CEC line in the HDMI cable 210. In this case, the standby microcomputer 131 acquires information on the power supply turning-on or turning-off manipulation over the CEC line.

Next, the action of the HPD detecting state machine 20 will be described below. The HPD detecting state machine 20 acts as described in a HPD detecting state chart shown in FIG. 12. HPD detecting states include an initialized state, an HDMI coupled state, an HDMI uncoupled state, and an HPD off state that is an HPD de-energized state.

When the main power supply is turned on (ACON), the HPD detecting state machine 20 enters the initialized state. When entering the initialized state, the HPD detecting state machine 20 initiates detection of an HPD signal. In the initialized state, if the HPD signal has a high level (HPD ON), the HPD detecting state machine 20 enters the HDMI coupled state. When entering the HDMI coupled state, the HPD detecting state machine 20 transmits a notification HDMI Coupled Event to the power supply managing state machine 10.

When the HPD detecting state machine 20 lies in the initialized state, if the HPD signal has a low level (HPD OFF), the HPD detecting state machine 20 enters the HDMI uncoupled state. When entering the HDMI uncoupled state, the HPD detecting state machine 20 transmits a notification HDMI Uncoupled Event to the power supply managing state machine 10. When the HPD detecting state machine 20 lies in the HDMI uncoupled state, if the HPD signal goes to the high level (HPD ON), the HPD detecting state machine 20 enters the HDMI coupled state.

When the HPD detecting state machine 20 lies in the HDMI coupled state, if the HPD signal has the low level (HPD OFF), the HPD detecting state machine 20 enters the HPD off state. When entering the HPD off state, the HPD detecting state machine 20 starts a removed/inserted deciding timer, and transmits a notification HPD Off Event to the power supply managing state machine 10.

When the HPD detecting state machine 20 lies in the HPD off state, if the HPD signal goes to the high level (HPD ON), the HPD detecting state machine 20 enters the HDMI coupled state. When the HPD detecting state machine 20 lies in the HPD off state, if the removed/inserted deciding timer indicates time-out, the HPD detecting state machine 20 enters the HDMI uncoupled state. When exiting the HPD off state, the HPD detecting state machine 20 stops the removed/inserted deciding timer.

Next, the action of the sink power supply monitoring state machine 30 will be described below. The sink power supply monitoring state machine 30 acts as described in a sink power supply monitoring state chart shown in FIG. 13. Sink power supply monitoring states include a sink power supply checked state, a sink power supply turned off state, and a sink power supply turned on state.

When the main power supply is turned on (ACON), the sink power supply monitoring state machine 30 enters the sink power supply checked state. When entering the sink power supply checked state, the sink power supply monitoring state machine 30 transmits a query Give Device Power Status to the television receiver 140 over the CEC line in the HDMI cable 210 so as to query the power supply state.

In this case, the sink power supply monitoring state machine 30 checks the state of the sink power supply (the power supply of the television receiver 140) on the basis of whether Off or On is transmitted as a response Report Power Status to the query from the television receiver 140 over the CEC line in the HDMI cable 210.

When the sink power supply monitoring state machine 30 lies in the sink power supply checked state, if the sink power supply is found to be turned off, the sink power supply monitoring state machine 30 enters the sink power supply turned off state. When entering the sink power supply turned off state, the sink power supply monitoring state machine 30 transmits a notification Sink Off Event to the power supply managing state machine 10, and starts a sink off timer counter. When the sink power supply monitoring state machine 30 lies in the sink power supply turned off state, if the sink off timer indicates time-out, for example, if ten sec has elapsed, the sink power supply monitoring state machine 30 returns to the sink power supply checked state. When exiting the sink power supply turned off state, the sink power supply monitoring state machine 30 stops the sink off timer.

When the sink power supply monitoring state machine 30 lies in the sink power supply checked state, if the sink power supply is found to be turned on, the sink power supply monitoring state machine 30 enters the sink power supply turned on state. When entering the sink power supply turned on state, the sink power supply monitoring state machine 30 transmits a notification Sink On Event to the power supply managing state machine 10, and starts a sink on timer counter. When the sink power supply monitoring state machine 30 lies in the sink power supply turned on state, if the sink on timer indicates time-out, for example, if ten sec has elapsed, the sink power supply monitoring state machine 30 returns to the sink power supply checked state. When exiting the sink power supply turned on state, the sink power supply monitoring state machine 30 stops the sink on timer.

Next, a control action for the power supply state to be performed by the power supply managing state machine 10 will be described below. The power supply managing state machine 10 performs the control action as described in a power supply state chart shown in FIG. 14. Power supply managing states include a standby state, an off state, and an on state.

When the main power supply is turned on (ACON), the power supply managing state machine 10 enters the standby state. When entering the standby state, the power supply managing state machine 10 starts a standby retention timer counter. When the power supply managing state machine 10 lies in the standby state, if the power supply managing state machine 10 is notified of a Sink On event by the sink power supply monitoring state machine 30, the power supply managing state machine 10 reenters the standby state. Reentering the standby state restarts the standby retention timer counter.

When the power supply managing state machine 10 lies in the standby state, if the standby retention timer indicates time-out, for example, if ten sec has elapsed, the power supply managing state machine 10 enters the off state. When exiting the standby state, the power supply managing state machine 10 stops the standby retention timer.

When entering the off state, the power supply managing state machine 10 sets the power supply state of the disk player 120 to the off state. When lying in the off state, if the power supply managing state machine 10 is notified of an HPD Off event by the HPD detecting state machine 20, the power supply managing state machine 10 returns to the standby state. When lying in the off state, if the power supply managing state machine 10 is notified of an HDMI Coupled event by the HPD detecting state machine 20, the power supply managing state machine 10 returns to the standby state. When the power supply managing state machine 10 lies in the off state, if the power supply managing state machine 10 is notified of a Sink On event by the sink power supply monitoring state machine 30, the power supply managing state machine 10 returns to the standby state. When exiting the off state, the power supply managing state machine 10 sets the power supply state of the disk player 120 to the standby state.

When the power supply managing state machine 10 lies in the standby state, if a notification Power Supply Turned On Event is generated, the power supply managing state machine 10 enters the on state. When entering the on state, the power supply managing state machine 10 sets the power supply state of the disk player 120 to the on state. When the power supply managing state machine 10 lies in the on state, if a notification Power Supply Turned Off Event is generated, the power supply managing state machine 10 returns to the standby state. When lying in the on state, if the power supply managing state machine 10 is notified of an HDMI Uncoupled event by the HPD detecting state machine 20, the power supply managing state machine 10 returns to the standby state. When exiting the on state, the power supply state machine 10 sets the power supply state of the disk player 120 to the standby state.

Next, a concrete example of the control action for the power supply state of the disk player 120 to be performed by the standby microcomputer 131 will be described below.

Concrete Example 1

A concrete example 1 will be described below. In the concrete example 1, a description will be made of a case where: the power supply interlocking facility employing the CEC line in the HDMI cable is energized in the television receiver 140; both the disk player 120 and television receiver 140 have the power supplies thereof turned off; and a user performs a manipulation of turning on the power supply of the television receiver 140. Incidentally, the main power supplies (ACON) of the disk player 120 and television receiver 140 alike shall be on.

Figure 15:
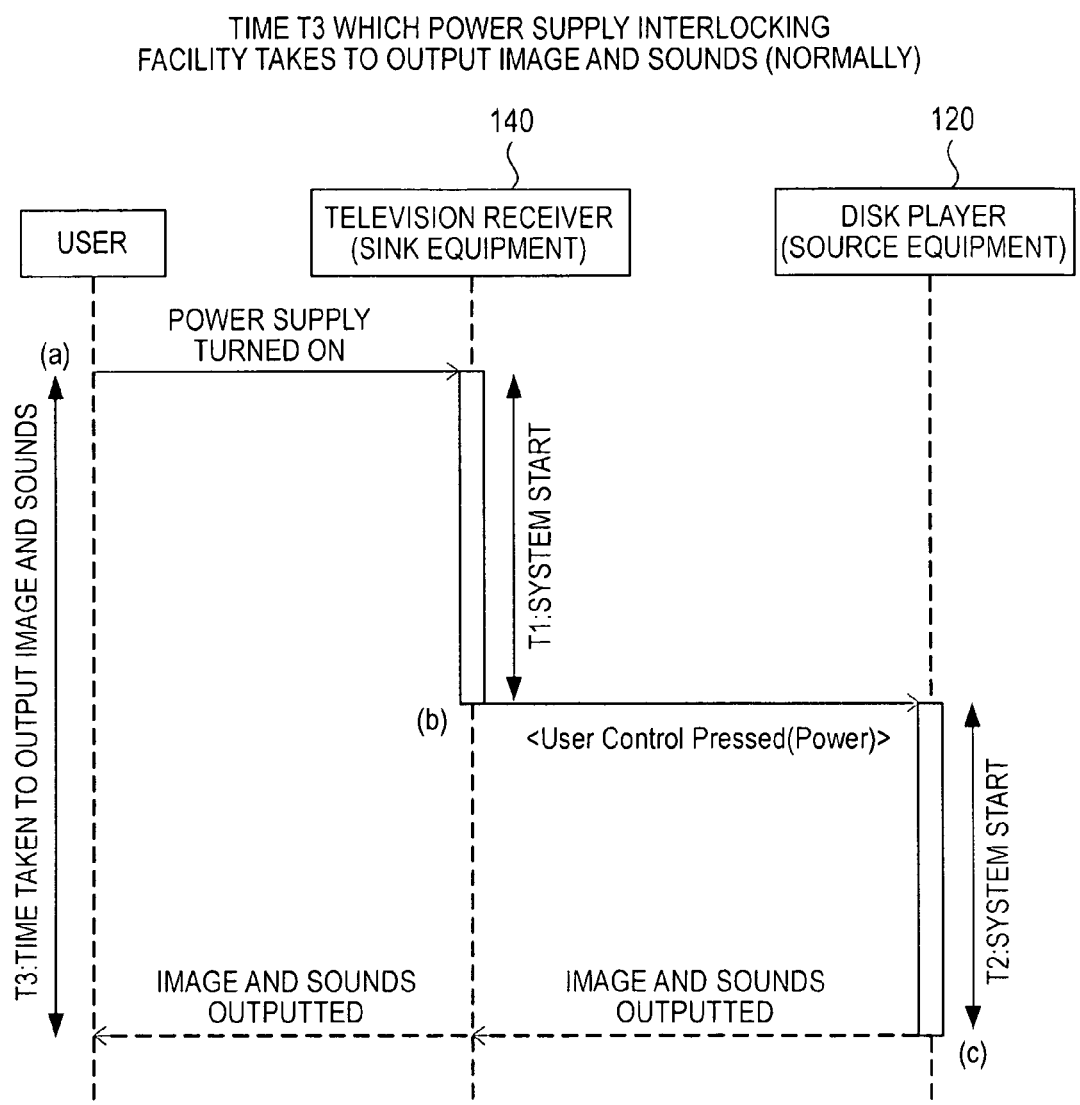
FIG. 15 is a diagram for use in explaining an example of the control action for the power supply state of the disk player to be performed by the standby microcomputer.

To begin with, referring to FIG. 15, an example of a control action in accordance with a related art will be described. (a) When a user performs the manipulation of turning on the power supply of the television receiver 140, the television receiver 140 initiates system start. In a time T1, the television receiver 140 completes the system start. The power supply state is set to the on state.

(b) After the power supply state is set to the on state, the television receiver 140 transmits Power On as User-Control Pressed information to the disk player 120 over the CEC line in the HDMI cable 210. Based on Power On of the User Control Pressed information, the disk player 120 initiates system start. In a time T2, the system start is completed and the power supply state is set to the on state.

(c) When the power supply state is set to the on state, the disk player 120 reproduces image and audio data items from the disk-like recording medium 128, and transmits the data items to the television receiver 140 over the HDMI cable 210. Thus, an image and sounds can be outputted.

In the example of the control action in accordance with the related art, a time T3 taken until an image and sounds reproduced by the disk player 120 can be outputted after a user performs the manipulation of turning on the power supply of the television receiver 140 comes to at least the sum of a system start time T1 for the television receiver 140 and a system start time T2 for the disk player 120.

Next, referring to FIG. 16, an example of a control action in accordance with the present embodiment will be described below. (a) When a user performs a manipulation of turning on the power supply of the television receiver 140, the television receiver 140 initiates system start. (b) When the power supply turning-on manipulation is performed, after a time T0 elapses, the television receiver 140 retains the connection switch 206 (see FIG. 5) in the on state for a predetermined time so that the voltage in the HPD line (HPD signal) will be changed from a low level to a high level.

(c) The standby microcomputer 131 (HPD detecting state machine 20) incorporated in the disk player 120 generates the notification HDMI Coupled Event in response to the change in the HPD signal. The standby microcomputer 131 (power supply managing state machine 10) changes the power supply state of the disk player 120 from the off state to the standby state (see FIG. 12 and FIG. 14). In this case, the main microcomputer 132 in the disk player 120 begins starting. After a time T4 elapses, the disk player 120 enters the standby state.

(d) After a time T1 elapses since initiation of system start, the television receiver 140 completes the system start, and the power supply state thereof is set to the on state. After the power supply state is set to the on state, the television receiver 140 transmits Power On as User Control Pressed information, which corresponds to power supply turned-on information concerning the television receiver 140, to the disk player 120 over the CEC line in the HDMI cable 210.

Figure 14:
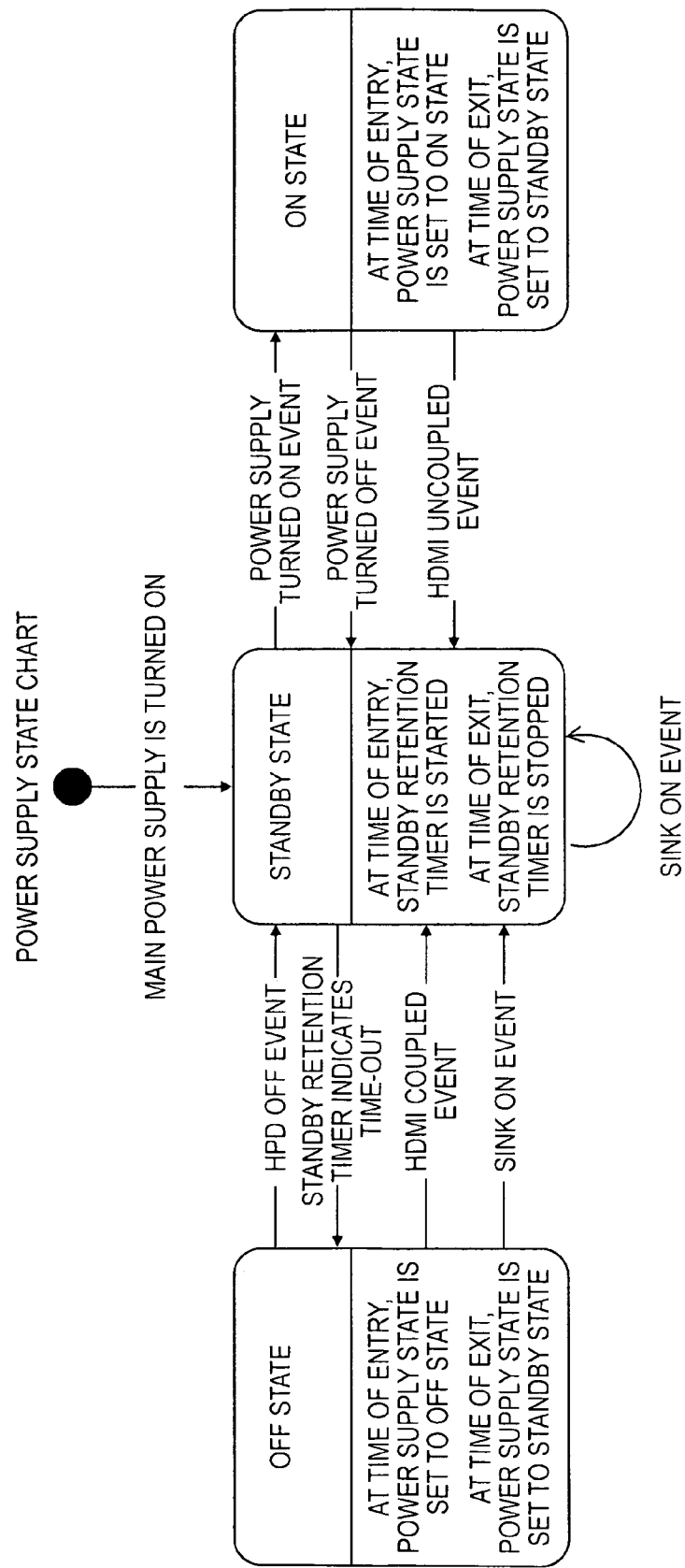
FIG. 14 is a power supply state chart for use in explaining the control action for the power supply state to be performed by the power supply managing state machine.

(e) Based on Power On of the User Control Pressed information, the standby microcomputer 131 in the disk player 120 generates a notification Power Supply Turned On Event so as to change the power supply state of the disk player 120 from the standby state to the on state (see FIG. 14). After a time T5 elapses since the power supply state is set to the standby state, the disk player 120 enters the on state.

(f) When the power supply state is set to the on sate, the disk player 120 reproduces image and audio data items from the disk-like recording medium 128, and transmits the data items to the television receiver 140 over the HDMI cable 210. Thus, an image and sounds can be outputted.

Figure 16:
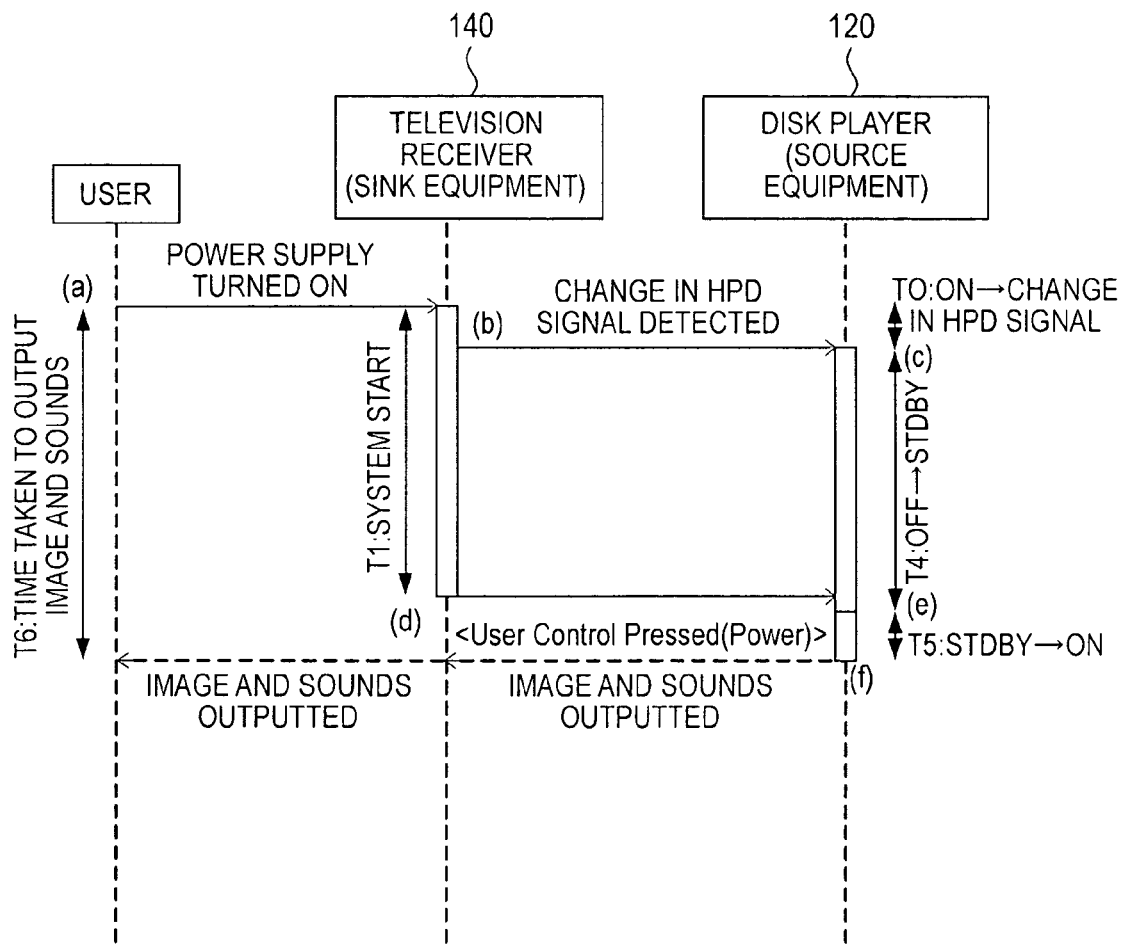
FIG. 16 is a diagram for use in explaining an example of the control action for the power supply state of the disk player to be performed by the standby microcomputer.

In the example of the control action shown in FIG. 16, a time T6 taken until an image and sounds reproduced by the disk player 120 can be outputted after a user performs a manipulation of turning on the power supply of the television receiver 140 comes to the sum total of the time T0 elapsing until the HPD signal changes after the user performs the power supply turning-on manipulation, the time T4 elapsing until the power supply state is changed from the off state to the standby state after the main microcomputer 132 in the disk player 120 is started, and the time T5 elapsing until the power supply state of the disk player 120 is changed from the standby state to the on state.

Now, the time T0 elapsing until the HPD signal changes after the user performs the power supply turning-on manipulation is shorter than the system start time T1 elapsing until the television receiver 140 completes system start after the television receiver 140 initiates the system start. Namely, T6=T0+T4+T5<T1+T2=T3 is established. Therefore, in the example of the control action in accordance with the present embodiment, compared with the example of the control action in accordance with the related art, the time taken until an image and sounds reproduced by the disk player 120 can be outputted after a user performs the manipulation of turning on the power supply of the television receiver 140 is reduced by T3−T6=T1−T0.

In the television receiver 140, if the time T0 elapsing until the HPD signal changes after the user performs the power supply turning-on manipulation is shortened on, for example, a hardware basis, that is, the time T0 is approached to 0, the above time can be further reduced.

Concrete Example 2

A concrete example 2 will be described below. In the concrete example 2, a description will be made of a case where: the power supply interlocking facility employing the CEC line in the HDMI cable is energized in the television receiver 140; the power supplies of both the disk player 120 and television receiver 140 are turned on; and a user performs a manipulation of turning off the power supply of the television receiver 140.

To begin with, referring to FIG. 17, an example of a control action to be performed when a user performs the manipulation of turning off the power supply of the television receiver 140 will be described below.

(a) When a user performs the manipulation of turning off the power supply of the television receiver 140, the television receiver 140 has the power supply thereof turned off. (b) After the power supply state is set to the off state, the television receiver 140 transmits Power Off as User Control Pressed information, which corresponds to power supply turned-off information concerning the television receiver 140, to the disk player 120 over the CEC line in the HDMI cable 210.

(c) Based on Power Off of the User Control Pressed information, the standby microcomputer 131 in the disk player 120 generates a notification Power Supply Turned Off Event so as to change the power supply state of the disk player 120 from the on state to the standby state (see FIG. 14). When the power supply state of the disk player 120 is set to the standby state, the standby microcomputer 131 (power supply managing state machine 10) starts the standby retention timer.

(d) After the elapse of a time T7 with which the standby retention timer indicates time-out, the standby microcomputer 131 (power supply managing state machine 10) changes the power supply state of the disk player 120 from the standby state to the off state (see FIG. 14).

Figure 17:
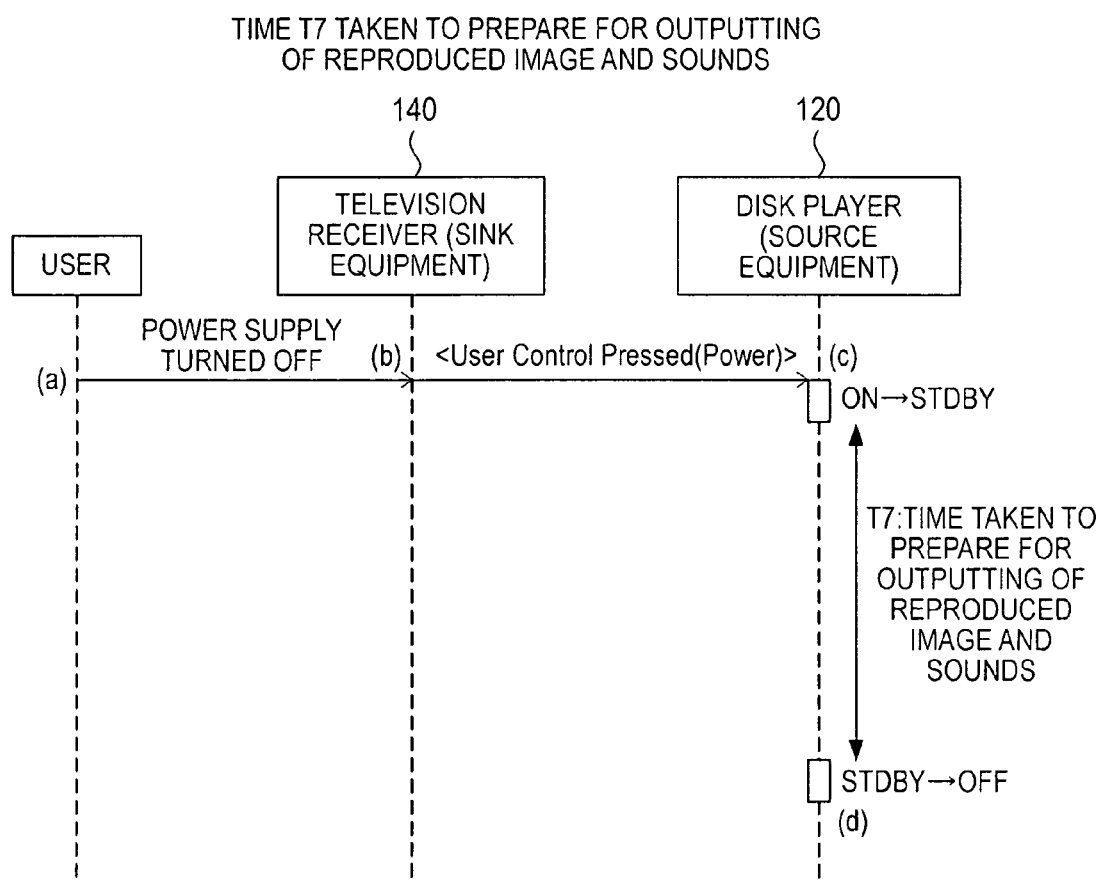
FIG. 17 is a diagram for use in explaining an example of the control action for the power supply state of the disk player to be performed by the standby microcomputer.

Next, referring to FIG. 17, an example of a control action to be performed in a case where after a user performs the manipulation of turning off the power supply of the television receiver 140, before the time T7 elapses, the user performs the manipulation of turning on the power supply of the television receiver 140.

(a) When a user performs the manipulation of turning off the power supply of the television receiver 140, the television receiver 140 has the power supply thereof turned off. (b) After the power supply state is set to the off state, the television receiver 140 transmits Power Off as User Control Pressed information, which corresponds to power supply turned-off information concerning the television receiver 140, to the disk player 120 over the CEC line in the HDMI cable 210.

(c) Based on Power Off of the User Control Pressed information, the standby microcomputer 131 in the disk player 120 generates a notification Power Supply Turned Off Event so as to change the power supply state of the disk player 120 from the on state to the standby state (see FIG. 14). When the power supply state of the disk player 120 is set to the standby state, the standby microcomputer 131 (power supply managing state machine 10) starts the standby retention timer.

(d) Before the standby retention timer indicates the elapse of the time T7, if the user performs the manipulation of turning on the power supply of the television receiver 140, the television receiver 140 initiates system start. (e) After the time T1 elapses since the initiation of system start, the television receiver 140 completes the system start. The power supply state of the television receiver 140 is set to the on state. After the power supply state thereof is set to the on state, the television receiver 140 transmits Power On as User Control Pressed information, which corresponds to information on the power supply turning-on manipulation, to the disk player 120 over the CEC line in the HDMI cable 210.

(f) Based on Power On of the User Control Pressed information, the standby microcomputer 131 in the disk player 120 generates a notification Power Supply Turned On Event so as to change the power supply state of the disk player 120 from the standby state to the on state (see FIG. 14). After the time T5 elapses, the disk player 120 has the power supply state thereof set to the on state. (g) When the power supply state is set to the on state, the disk player 120 reproduces image and audio data items from the disk-like recording medium 128, and transmits the data items to the television receiver 140 over the HDMI cable 210. Thus, an image and sounds can be outputted.

Figure 18:
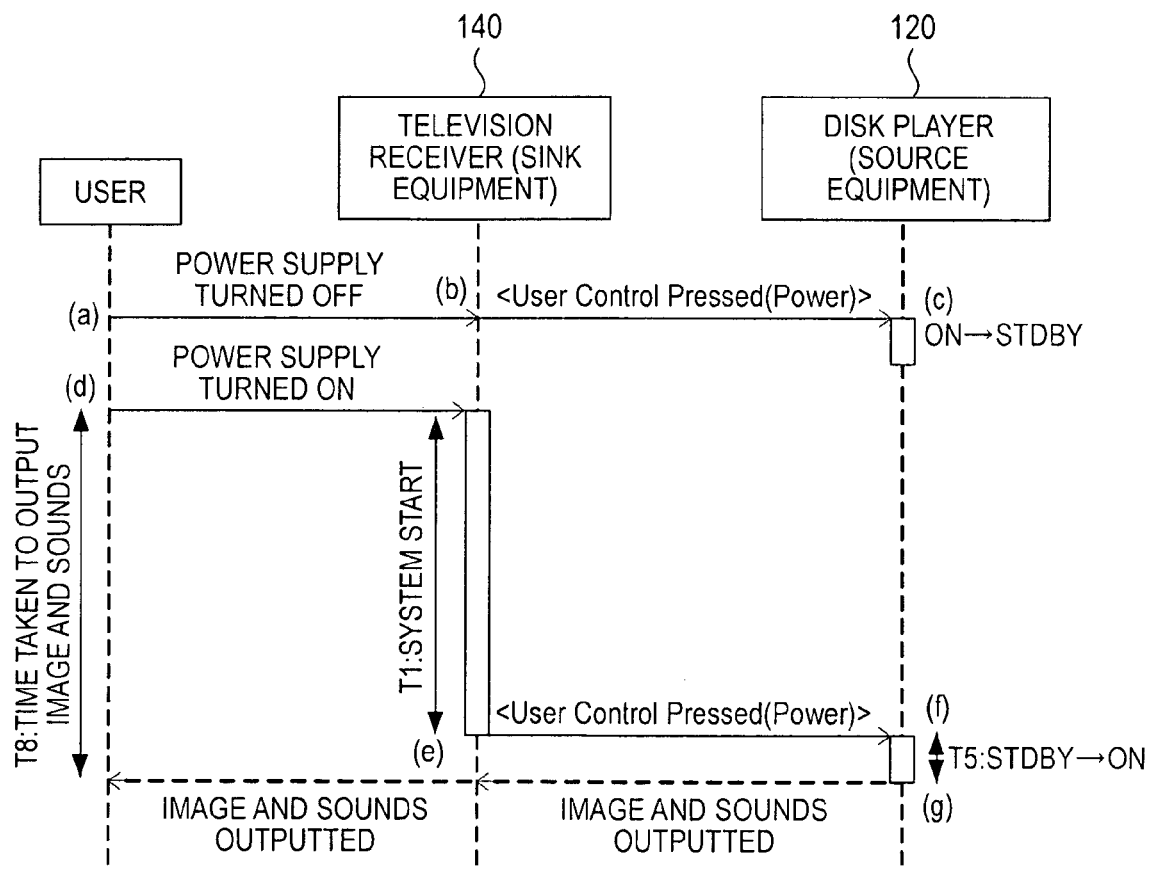
FIG. 18 is a diagram for use in explaining an example of the control action for the power supply state of the disk player to be performed by the standby microcomputer.

In the example of the control action shown in FIG. 18, the user performs the manipulation of turning on the power supply of the television receiver 140. If the user manipulates the power supply of the television receiver 140 within the time T7, a time T8 taken until the image and sounds reproduced by the disk player 120 can be outputted after the power supply turning-on manipulation is performed comes to the sum of the system start time T1 for the television receiver 140 and the time T5 elapsing until the power supply state of the disk player 120 is changed from the standby state to the on state.

Herein, the time T5 is shorter than the system start time T2 (see FIG. 15) elapsing until the power supply state of the disk player 120 is changed from the off state to the on state. Therefore, after the user performs the manipulation of turning off the power supply of the television receiver 140, if the user performs the power supply turning-on manipulation with the time T7, the action of the disk player 120 is the action of changing the power supply state thereof from the standby state to the on state. Therefore, even when the user performs the power supply turning-off manipulation by mistake, restart can be speeded up.

Concrete Example 3

A concrete example 3 will be described below. In the concrete example 3, a description will be made of a case where: the power supply interlocking facility employing the CEC line in the HDMI cable is de-energized in the television receiver 140; the power supplies of both the disk player 120 and television receiver 140 are turned off; a user performs a manipulation of turning on the power supply of the television receiver 140 so as to start the system of the television receiver 140; and the user then performs an input switching manipulation on the disk player 120, and performs the manipulation of turning on the power supply of the disk player 120.

Figure 19:
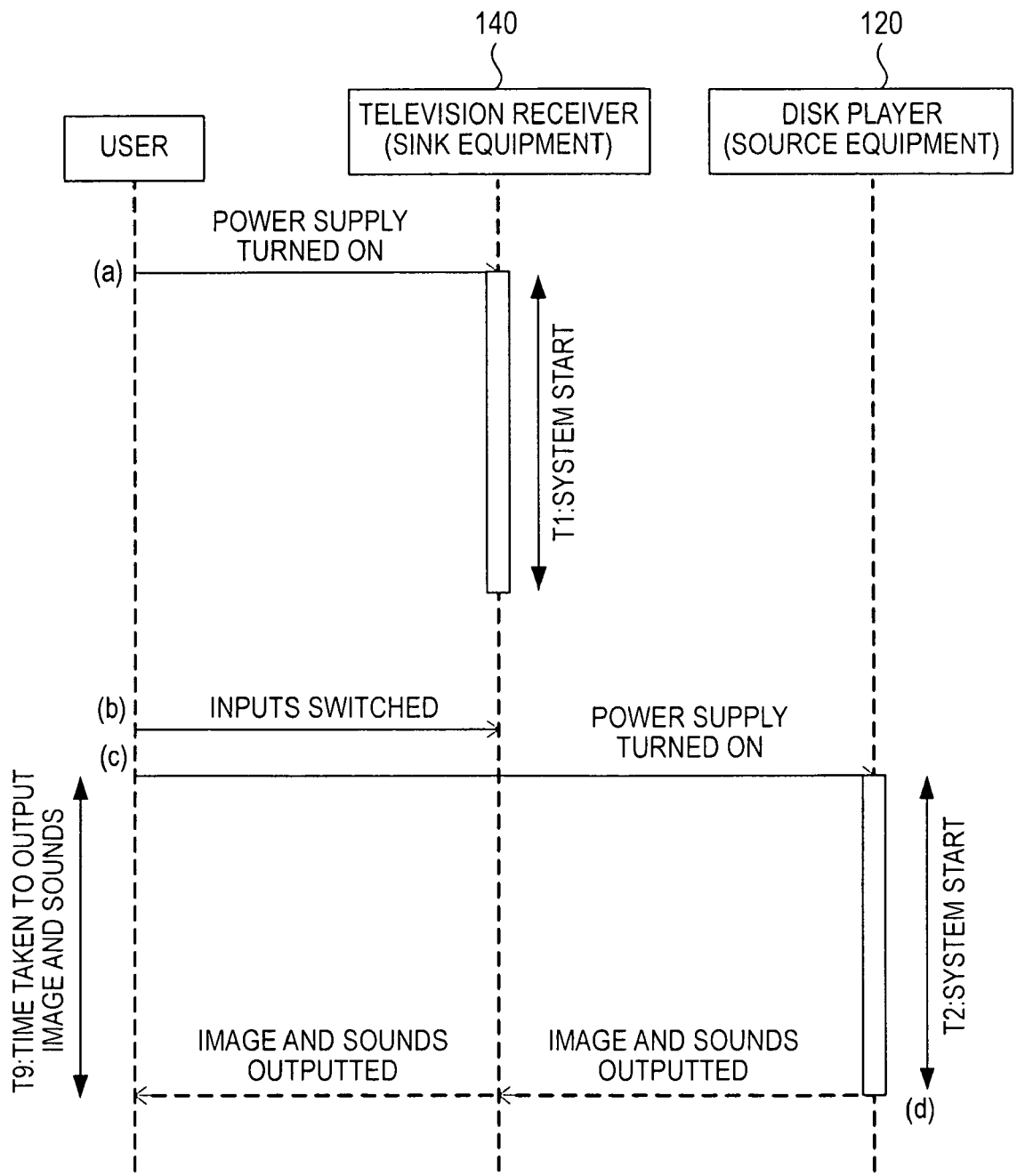
FIG. 19 is a diagram for use in explaining an example of the control action for the power supply state of the disk player to be performed by the standby microcomputer.

To begin with, referring to FIG. 19, an example of a control action in accordance with the related art will be described below. (a) When a user performs the manipulation of turning on the power supply of the television receiver 140, the television receiver 140 initiates system start. In a time T1, the television receiver 140 completes the system start, and the power supply state thereof is set to the on state.

(b) The user switches inputs to select an input from the disk player 120 using, for example, the tuner. (c) Thereafter, when the user performs the manipulation of turning on the power supply of the disk player 120, the disk player 120 initiates system start. In a time T2, the system start is completed and the power supply state is set to the on state.

(d) When the power supply state of the disk player 120 is set to the on state, the disk player 120 reproduces image and audio data items from the disk-like recording medium 128, and transmits the data items to the television receiver 140 over the HDMI cable 210. Thus, an image and sounds can be outputted.

In the example of the control action in accordance with the related art, a time T9 taken until an image and sounds reproduced by the disk player 120 can be outputted after a user performs the manipulation of turning on the power supply of the disk player 120 is nearly identical to the system start time T2 for the disk player 120.

Next, an example of a control operation in accordance with the present embodiment will be described in conjunction with FIG. 20. (a) When a user performs the manipulation of turning on the power supply of the television receiver 140, the television receiver 140 initiates system start. (b) The standby microcomputer 131 (sink power supply monitoring state machine 30) in the disk player 120 transmits a query Give Device Power Status to the television receiver 140 at regular intervals, for example, at intervals of ten sec so as to query the power supply state of the television receiver 140. If system start is in progress, the television receiver 140 transmits Off as a Report Power Status response to the disk player 120.

(c) In the time T1, the television receiver 140 completes system start. When the power supply state is set to the on state, the television receiver 140 transmits On as a Report Power Status response to the disk player 120.

(d) Based on One of the Report Power Status response that corresponds to power supply turned-on information concerning the television receiver 140, the standby microcomputer 131 (sink power supply monitoring state machine 30) in the disk player 120 generates a notification Sink Turned On Event. The standby microcomputer 131 (power supply managing state machine 10) changes the power supply state of the disk player 120 from the off state to the standby state (see FIG. 13 and FIG. 14). In this case, the main microcomputer 132 in the disk player 120 initiates system start. After the time T4 elapses, the power supply state of the disk player 120 is set to the standby state.

(e) The user uses, for example, the tuner to switch inputs to select an input from the disk player 120. (f) Thereafter, when the user performs the manipulation of turning on the power supply of the disk player 120, (g) the standby microcomputer 131 in the disk player 120 generates a notification Power Supply Turned On Event so as to change the power supply state of the disk player 120 from the standby state to the on state (see FIG. 14). When the time T5 has elapsed after the power supply state is set to the standby state, the power supply state of the disk player 120 is set to the on state.

(h) When the power supply state of the disk player 120 is set to the on state, the disk player 120 reproduces image and audio data items from the disk-like recording medium 128, and transmits the data items to the television receiver 140 over the HDMI cable 210. Thus, an image and sounds can be outputted.

Figure 20:
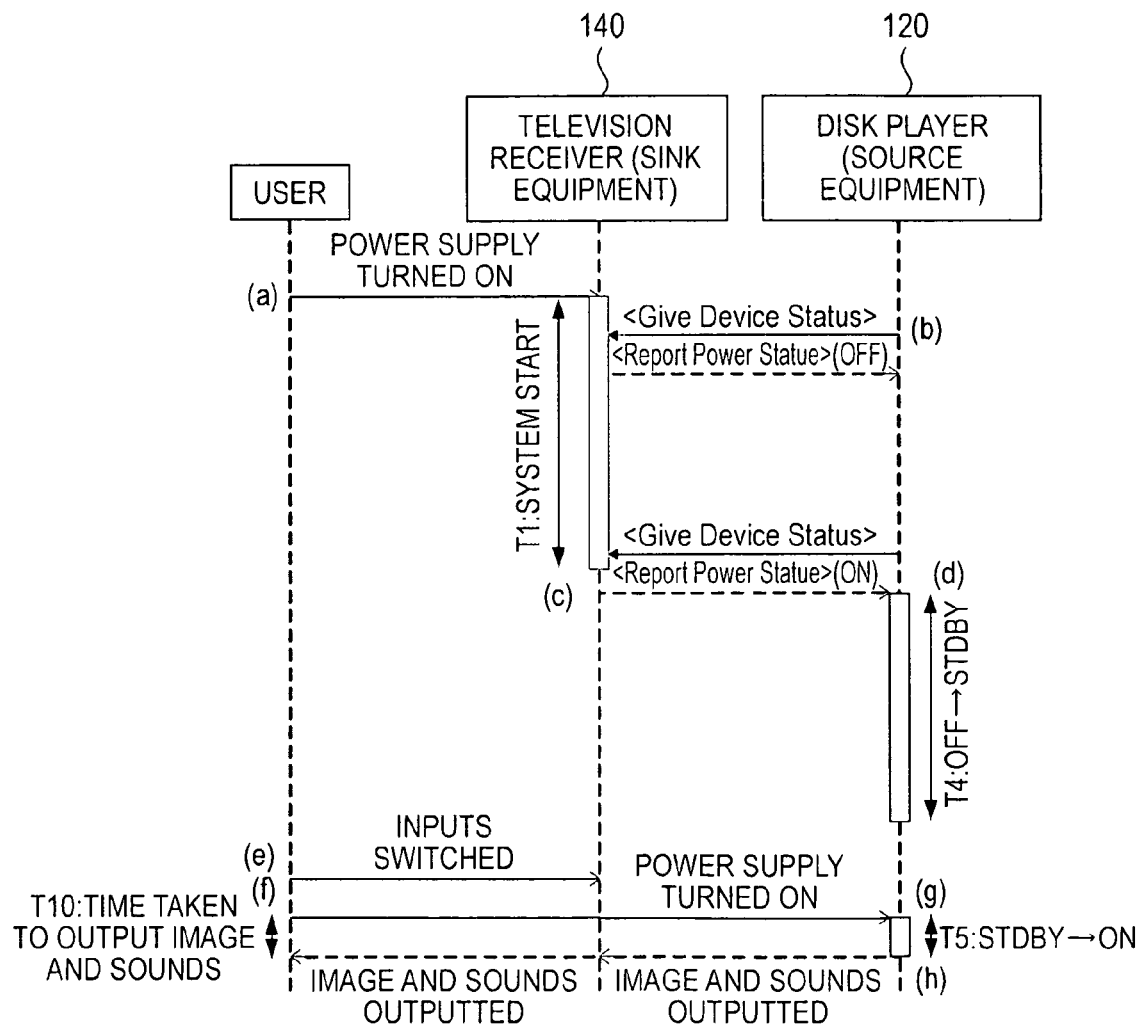
FIG. 20 is a diagram for use in explaining an example of the control action for the power supply state of the disk player to be performed by the standby microcomputer.

In the example of the control action shown in FIG. 20, a time T10 taken until the image and sounds reproduced by the disk player 120 can be outputted after the user performs the manipulation of turning on the power supply of the disk player 120 is nearly equal to the time T5 elapsing until the power supply state of the disk player 120 is changed from the standby state to the on state. The time T5 is shorter than the system start time T2 (see FIG. 15) elapsing until the power supply state of the disk player 120 is changed from the off state to the one state. Therefore, after the user switches inputs to select the input from the disk player 120, system start of the disk player can be speeded up.

In the AV system 100 shown in FIG. 1, when power supply turned-on information concerning the television receiver 140 (a change in the HPD signal or On as a Report Power Status response) is acquired, the disk player 120 has the power supply state thereof changed from the off state to the standby state. Therefore, when the power supply turning-on manipulation is performed, the disk player 120 should merely have the power supply state thereof changed from the standby state to the on state. Therefore, the time taken until the disk player 120 actually enters a power supply turned-on state after the user performs the power supply turning-on manipulation can be shortened. Eventually, system start can be speeded up.

In the AV system 100 shown in FIG. 1, when information on a power supply turning-off manipulation (Power Off as User Control Pressed information) is acquired, the disk player 120 has the power supply state thereof changed from the on state to the standby state. Therefore, when the power supply turning-off manipulation is performed on the television receiver 140 by mistake, if a power supply turning-on manipulation is immediately performed on the television receiver 140, the disk player 20 should merely have the power supply state thereof changed from the standby state to the on state. Therefore, in this case, the time elapsing until the power supply is actually turned on after a user performs the power supply turning-on manipulation can be shortened.

In the AV system 100 shown in FIG. 1, assume that information on a power supply turning-off manipulation is acquired as mentioned above, and the power supply state of the disk player 120 is changed from the on state to the standby state. In this case, although a predetermined time (time T7) has elapsed, if information on a power supply turning-on manipulation (Power On as User Control Pressed information) is not acquired, the power supply state of the disk player 120 is further changed from the standby state to the off state. Therefore, when the power supply turning-off manipulation performed on the television receiver 140 is no mistake, the power supply turning-on manipulation will not be immediately performed on the television receiver 140. At this time, the disk player 120 can be prevented from being retained in the standby state. Eventually, unnecessary power consumption can be prevented.

In the aforesaid embodiment, the present invention is applied to the disk player 120 that is a source equipment. However, the present invention can be applied to the television receiver 140 that is a sink equipment in the same manner. Occasions on which the sink equipment is requested to speed up system start include, for example, a one-touch play mode and an occasion on which the manipulation of turning on the power supply of the sink equipment is performed with the power supply of the sink equipment turned on.

In the aforesaid embodiment, the control unit 122 in the disk player 120 includes, in addition to the main microcomputer (digital microcomputer) 132, the standby microcomputer 131 that manages the power supply state. However, the constitution including both the main microcomputer 132 and standby microcomputer 131 need not be adopted all the time. The main microcomputer 132 alone may be included, and the main microcomputer 132 may have the capability to manage the power supply state.

In the aforesaid embodiment, the AV system 10 adopts the disk player 120 as a source equipment, and adopts the television receiver 140 as a sink equipment. The present invention can be similarly applied to a system including another source equipment and another sink equipment. For example, the present invention can be similarly applied to a receiving system having a settop box for receiving a terrestrial digital broadcast, which serves as a source equipment, and a television receiver, which serves as a sink equipment, connected to each other. Even in this case, system start can be speeded up.

In relation to the aforesaid embodiment, a description has been made on the assumption that a transmission line linking electronic equipments (source equipment and sink equipment) is an interface conformable to the HDMI specifications. Alternatively, the present invention can be applied to any other similar transmission specifications. In the aforesaid embodiment, the electronic equipments are connected to each other over the HDMI cable. Alternatively, the present invention can be similarly applied to a form in which the electronic equipment are connected to each other by radio.

The present invention can realize speedup of system start by shortening the time elapsing until a power supply is actually turned on after a user performs a power supply turning-on manipulation. The present invention can be applied, for example, to an AV system having a disk player and a television receiver connected to each other using an HDMI interface.

It should be understood by those skilled in the art that various modifications, combinations, sub-combinations and alterations may occur depending on design requirements and other factors insofar as they are within the scope of the appended claims or the equivalents thereof.

What is claimed is:
1. An electronic equipment comprising:
    a data transmission unit that transmits content data to an external equipment over a transmission line or receives the content data from the external equipment over the transmission line;

a power supply turned-on information acquisition unit that acquires power supply turned-on information concerning the external equipment;

an information-on-manipulation acquisition unit that acquires information on a power supply turning-on manipulation; and a power supply state control unit that controls a power supply state into any of an off state, a standby state, and an on state, wherein when the power supply turned-on information acquisition unit acquires the power supply turned-on information concerning the external equipment with the power supply state set to the off state, the power supply state control unit changes the power supply state from the off state to the standby state; and when the information-on-manipulation acquisition unit acquires the information on the power supply turning-on manipulation with the power supply state set to the standby state, the power supply state control unit changes the power supply state from the standby state to the on state, wherein the power supply turned-on information acquisition unit acquires the power supply turned-on information concerning the external equipment on the basis of a voltage change in a predetermined line included in the transmission line, and wherein the predetermined line includes a facility that notifies the connected state of the external equipment according to a dc bias voltage.

2. The electronic equipment according to claim 1, further comprising a user operating unit to be manipulated by a user, wherein the information-on-manipulation acquisition unit acquires the information on the power supply turning-on manipulation on the basis of a manipulation performed on the user operating unit.

3. The electronic equipment according to claim 1, further comprising an information-on-power supply turning-off manipulation acquisition unit that acquires information on a power supply turning-off manipulation, wherein when the information-on-power supply turning-off manipulation acquisition unit acquires the information on the power supply turning-off manipulation with the power supply state set to the on state, the power supply state control unit changes the power supply state from the on state to the standby state.

4. The electronic equipment according to claim 3, wherein after the power supply state control unit sets the power supply state to the standby state, even when a predetermined time has elapsed, if the information-on-manipulation acquisition unit does not acquire the information on the power supply turning-on manipulation, the power supply state control unit changes the power supply state from the standby state to the off state.

5. An electronic equipment comprising:

a data transmission unit that transmits content data to an external equipment over a transmission line or receives the content data from the external equipment over the transmission line;

a power supply turned-on information acquisition unit that acquires power supply turned-on information concerning the external equipment;

an information-on-manipulation acquisition unit that acquires information on a power supply turning-on manipulation; and a power supply state control unit that controls a power supply state into any of an off state, a standby state, and an on state, wherein when the power supply turned-on information acquisition unit acquires the power supply turned-on information concerning the external equipment with the power supply state set to the off state, the power supply state control unit changes the power supply state from the off state to the standby state; and when the information-on-manipulation acquisition unit acquires the information on the power supply turning-on manipulation with the power supply state set to the standby state, the power supply state control unit changes the power supply state from the standby state to the on state, wherein the data transmission unit transmits the content data to the external equipment on multiple channels in the form of differential signals over the transmission line, or receives the content data from the external equipment on the multiple channels in the form of the differential signals over the transmission line, wherein the power supply turned-on information acquisition unit acquires the power supply turned-on information concerning the external equipment on the basis of a voltage change in a predetermined line included in the transmission line, and wherein the predetermined line includes a facility that notifies the connected state of the external equipment according to a dc bias voltage.

6. An electronic equipment comprising:

a data transmission unit that transmits content data to an external equipment over a transmission line or receives the content data from the external equipment over the transmission line;

a power supply turned-on information acquisition unit that acquires power supply turned-on information concerning the external equipment;

an information-on-manipulation acquisition unit that acquires information on a power supply turning-on manipulation; and a power supply state control unit that controls a power supply state into any of an off state, a standby state, and an on state, wherein when the power supply turned-on information acquisition unit acquires the power supply turned-on information concerning the external equipment with the power supply state set to the off state, the power supply state control unit changes the power supply state from the off state to the standby state; and when the information-on-manipulation acquisition unit acquires the information on the power supply turning-on manipulation with the power supply state set to the standby state, the power supply state control unit changes the power supply state from the standby state to the on state, wherein the data transmission unit transmits the content data to the external equipment on multiple channels in the form of differential signals over the transmission line, or receives the content data from the external equipment on the multiple channels in the form of the differential signals over the transmission line, wherein the power supply turned-on information acquisition unit acquires the power supply turned-on information concerning the external equipment on the basis of a voltage change in a predetermined line included in the transmission line, and, wherein the power supply turned-on information acquisition unit queries the external equipment about the power supply state over a control data line included in the transmission line, and acquires the power supply turned-on information concerning the external equipment on the basis of a response to the query.

7. An electronic equipment comprising:
a data transmission unit that transmits content data to an external equipment over a transmission line or receives the content data from the external equipment over the transmission line;
a power supply turned-on information acquisition unit that acquires power supply turned-on information concerning the external equipment;
an information-on-manipulation acquisition unit that acquires information on a power supply turning-on manipulation; and
a power supply state control unit that controls a power supply state into any of an off state, a standby state, and an on state,
wherein when the power supply turned-on information acquisition unit acquires the power supply turned-on information concerning the external equipment with the power supply state set to the off state, the power supply state control unit changes the power supply state from the off state to the standby state; and
when the information-on-manipulation acquisition unit acquires the information on the power supply turning-on manipulation with the power supply state set to the standby state, the power supply state control unit changes the power supply state from the standby state to the on state,
wherein the data transmission unit transmits the content data to the external equipment on multiple channels in the form of differential signals over the transmission line, or receives the content data from the external equipment on the multiple channels in the form of the differential signals over the transmission line, and
wherein the power supply turned-on information acquisition unit queries the external equipment about the power supply state over a control data line included in the transmission line, and acquires the power supply turned-on information concerning the external equipment on the basis of a response to the query.

8. An electronic equipment comprising:
a data transmission unit that transmits content data to an external equipment over a transmission line or receives the content data from the external equipment over the transmission line;
a power supply turned-on information acquisition unit that acquires power supply turned-on information concerning the external equipment;
an information-on-manipulation acquisition unit that acquires information on a power supply turning-on manipulation; and
a power supply state control unit that controls a power supply state into any of an off state, a standby state, and an on state,
wherein when the power supply turned-on information acquisition unit acquires the power supply turned-on information concerning the external equipment with the power supply state set to the off state, the power supply state control unit changes the power supply state from the off state to the standby state; and
when the information-on-manipulation acquisition unit acquires the information on the power supply turning-on manipulation with the power supply state set to the standby state, the power supply state control unit changes the power supply state from the standby state to the on state,
wherein the data transmission unit transmits the content data to the external equipment on multiple channels in the form of differential signals over the transmission line, or receives the content data from the external equipment on the multiple channels in the form of the differential signals over the transmission line, and
wherein the information-on-manipulation acquisition unit acquires the information on the power supply turning-on manipulation over a control data line included in the transmission line.

9. The electronic equipment according to claim 8, further comprising a user operating unit to be manipulated by a user, wherein the information-on-manipulation acquisition unit acquires the information on the power supply turning-on manipulation on the basis of a manipulation performed on the user operating unit.

10. An electronic equipment comprising:
a data transmission unit that transmits content data to an external equipment over a transmission line or receives the content data from the external equipment over the transmission line;
a power supply turned-on information acquisition unit that acquires power supply turned-on information concerning the external equipment;
an information-on-manipulation acquisition unit that acquires information on a power supply turning-on manipulation; and
a power supply state control unit that controls a power supply state into any of an off state, a standby state, and an on state,
wherein when the power supply turned-on information acquisition unit acquires the power supply turned-on information concerning the external equipment with the power supply state set to the off state, the power supply state control unit changes the power supply state from the off state to the standby state; and
when the information-on-manipulation acquisition unit acquires the information on the power supply turning-on manipulation with the power supply state set to the standby state, the power supply state control unit changes the power supply state from the standby state to the on state,
said electronic equipment further comprising an information-on-power supply turning-off manipulation acquisition unit that acquires information on a power supply turning-off manipulation, wherein when the information-on-power supply turning-off manipulation acquisition unit acquires the information on the power supply turning-off manipulation with the power supply state set to the on state, the power supply state control unit changes the power supply state from the on state to the standby state,
wherein:
the data transmission unit transmits the content data to the external equipment on multiple channels in the form of differential signals over the transmission line, or receives the content data from the external equipment on the multiple channels in the form of differential signals over the transmission line; and
the information-on-power supply turning-off manipulation acquisition unit acquires the information on the power supply turning-off manipulation over a control data line included in the transmission line.

11. A power supply state control method for an electronic equipment that includes a data transmission unit which transmits content data to an external equipment over a transmission line or receives the content data from the external equipment over the transmission line, a power supply turned-on information acquisition unit which acquires power supply turned-on information concerning the external equipment, and an information-on-manipulation acquisition unit which acquires information on a power supply turning-on manipulation, and that supports as a power supply state an off state, a standby state, and an on state, the method comprising the steps of:

when the power supply turned-on information acquisition unit acquires the power supply turned-on information concerning the external equipment with the power supply state set to the off state, changing the power supply state from the off state to the standby state; and when the information-on-manipulation acquisition unit acquires the information on the power supply turning-on manipulation with the power supply state set to the standby state, changing the power supply state from the standby state to the on state, wherein the power supply turned-on information acquisition unit acquires the power supply turned-on information concerning the external equipment on the basis of a voltage change in a predetermined line included in the transmission line, and wherein the predetermined line includes a facility that notifies the connected state of the external equipment according to a dc bias voltage.

* * * * *